United States Patent
Takano

(10) Patent No.: US 10,462,635 B2
(45) Date of Patent: Oct. 29, 2019

(54) INFORMATION PROCESSING APPARATUS AND CONTROL METHOD THEREFOR, PORTABLE TERMINAL AND CONTROL METHOD THEREFOR, AND SERVICE PROVIDING SYSTEM

(71) Applicant: CANON KABUSHIKI KAISHA, Tokyo (JP)

(72) Inventor: Shinichi Takano, Akashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/862,242

(22) Filed: Jan. 4, 2018

(65) Prior Publication Data

US 2018/0132090 A1    May 10, 2018

Related U.S. Application Data

(63) Continuation of application No. 15/181,778, filed on Jun. 14, 2016, now Pat. No. 9,894,470.

(30) Foreign Application Priority Data

Jun. 26, 2015 (JP) .................................. 2015-129200

(51) Int. Cl.
    *H04W 4/80* (2018.01)
    *H04W 8/00* (2009.01)
    *H04W 76/14* (2018.01)

(52) U.S. Cl.
    CPC ............. *H04W 4/80* (2018.02); *H04W 8/005* (2013.01); *H04W 76/14* (2018.02)

(58) Field of Classification Search
None
See application file for complete search history.

(56) References Cited

U.S. PATENT DOCUMENTS

| | | |
|---|---|---|
| 2005/0009561 A1 | 1/2005 | Hollstrom et al. |
| 2005/0079819 A1 | 4/2005 | Tsutsui |
| 2005/0113025 A1 | 5/2005 | Akamatsu et al. |
| 2007/0061374 A1 | 3/2007 | Inakawa et al. |
| 2007/0127069 A1 | 6/2007 | Steele et al. |
| 2007/0201358 A1 | 8/2007 | Kawamoto et al. |
| 2007/0274233 A1 | 11/2007 | Ptashek et al. |

(Continued)

FOREIGN PATENT DOCUMENTS

| | | |
|---|---|---|
| JP | 2001007856 A | 1/2001 |
| JP | 2007143059 A | 6/2007 |

(Continued)

OTHER PUBLICATIONS

Office Action issued in Japanese Appln. No. 2016-228272 dated Aug. 7, 2017.

(Continued)

*Primary Examiner* — David Bilodeau
(74) *Attorney, Agent, or Firm* — Rossi, Kimms & McDowell LLP

(57) ABSTRACT

According to this invention, a service providing apparatus displays information of an information device cooperating with a wearable information device connected by wireless communication, and performs service execution processing for the information device cooperating with the wearable information device.

12 Claims, 22 Drawing Sheets

(56) References Cited

U.S. PATENT DOCUMENTS

| | | |
|---|---|---|
| 2009/0002750 A1 | 1/2009 | Arai |
| 2009/0052344 A1 | 2/2009 | Fujii |
| 2012/0045993 A1 | 2/2012 | Page et al. |
| 2012/0311452 A1 | 12/2012 | Takano |
| 2013/0178163 A1* | 7/2013 | Wang .................. H04W 48/10 455/41.2 |
| 2013/0288604 A1* | 10/2013 | Chang .................. H04W 84/18 455/41.2 |
| 2014/0287687 A1* | 9/2014 | Bakin .................. H04W 4/005 455/41.2 |
| 2015/0050886 A1* | 2/2015 | Donaldson ............. H04W 4/00 455/41.2 |
| 2015/0373760 A1* | 12/2015 | Palin .................. H04W 76/023 455/41.2 |
| 2015/0373761 A1 | 12/2015 | Okamoto |
| 2016/0358389 A1 | 12/2016 | Menard et al. |
| 2016/0366708 A1* | 12/2016 | Yeom .................. H04W 76/10 |
| 2017/0094447 A1 | 3/2017 | Sasaki et al. |
| 2017/0231022 A1 | 8/2017 | Ito et al. |
| 2018/0075222 A1* | 3/2018 | Chen .................. G16H 10/40 |

FOREIGN PATENT DOCUMENTS

| | | |
|---|---|---|
| JP | 2015018384 A | 1/2015 |
| WO | 2015091951 A1 | 6/2015 |

OTHER PUBLICATIONS

Office Action issued in U.S. Appl. No. 15/181,778 dated Jun. 2, 2017.

Notice of Allowance issued in U.S. Appl. No. 15/181,778 dated Nov. 6, 2017.

* cited by examiner

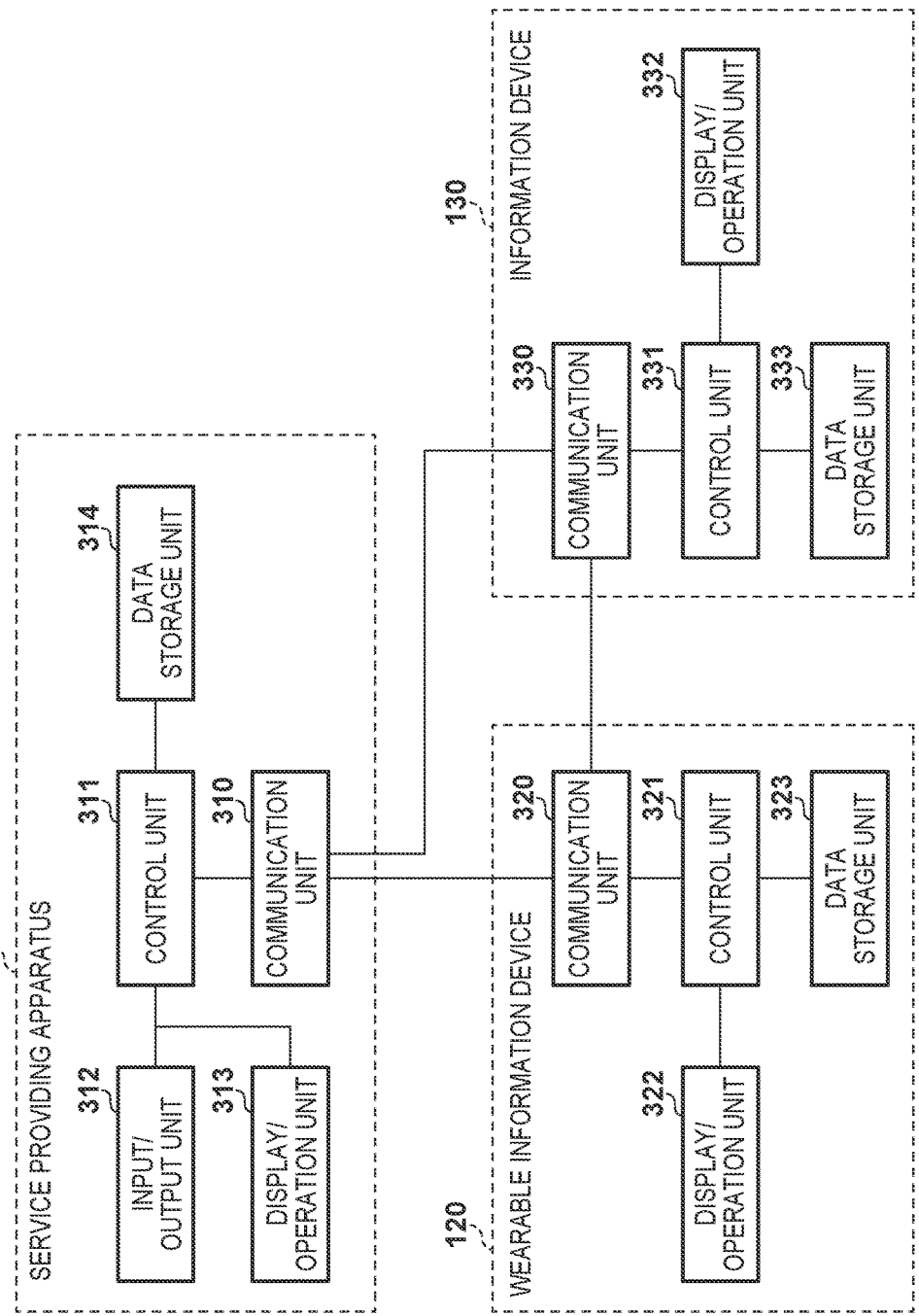

FIG. 4A

| 401 | 402 | 403 | 404 | 405 | 406 | 407 | 408 |
|---|---|---|---|---|---|---|---|
| SERIAL NUMBER | DEVICE NAME | MODEL NAME | PLATFORM | OS VERSION | Wi-Fi ADDRESS | Bluetooth ADDRESS | PARTNER DEVICE ID |
| FP1BK62MF7K3... | Watch_A | MD111J/A | WW | 110 | C8:J2:K2:16:... | C8:89:1J:32:... | 100 |

FIG. 4B

| 410 | 411 | 412 | 413 | 414 | 415 | 416 | 417 |
|---|---|---|---|---|---|---|---|
| PARTNER DEVICE ID | SERIAL NUMBER | DEVICE NAME | MODEL NAME | PLATFORM | OS VERSION | Bluetooth ADDRESS | CORRESPONDING SERVICE |
| 100 | DPS7SH2H78P2... | Mobile_A | MD222J/A | MM | 220 | C8:89:4W:81:... | Service_aaa |

FIG. 5A

| 501 | 502 | 503 | 504 | 505 | 506 | 507 | 508 | 509 |
|---|---|---|---|---|---|---|---|---|
| SERIAL NUMBER | DEVICE NAME | MODEL NAME | PLATFORM | OS VERSION | Wi-Fi ADDRESS | Bluetooth ADDRESS | CORRESPONDING SERVICE | PARTNER DEVICE ID |
| DPS7SE2H78P2... | Mobile_A | MD222J/A | MM | 220 | C8:J2:X8:90:... | C8:89:4W:81:... | Service_aaa | 111 |

FIG. 5B

| 510 | 511 | 512 | 513 | 514 | 515 | 516 |
|---|---|---|---|---|---|---|
| PARTNER DEVICE ID | SERIAL NUMBER | DEVICE NAME | MODEL NAME | PLATFORM | OS VERSION | Bluetooth ADDRESS |
| 111 | FP1BK62MF7K3... | Watch_A | MD111J/A | WW | 110 | C8:89:1J:32:... |

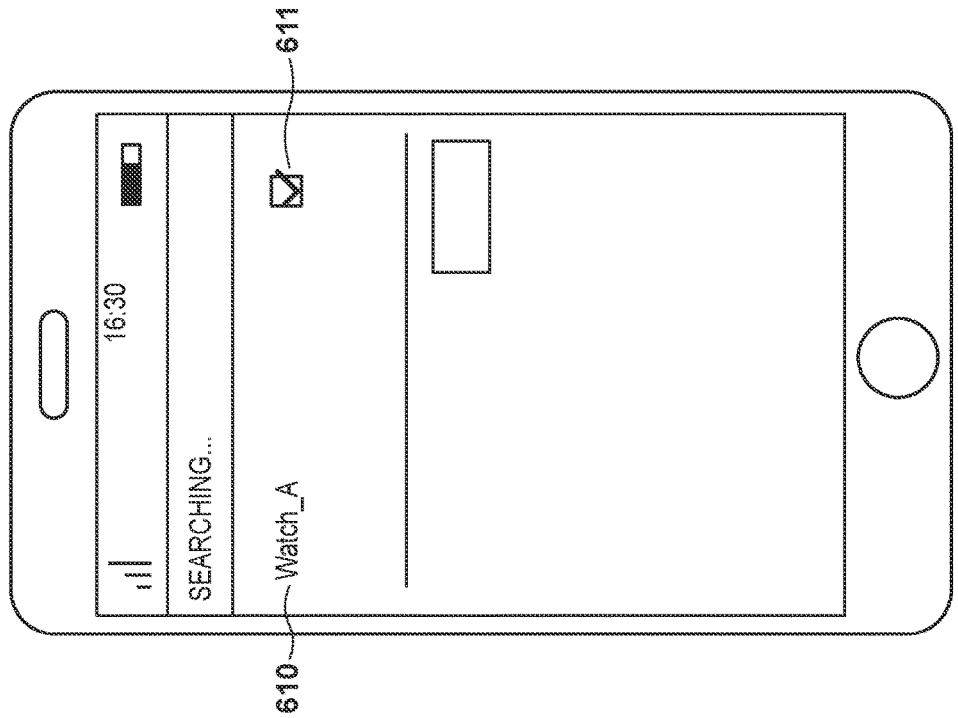
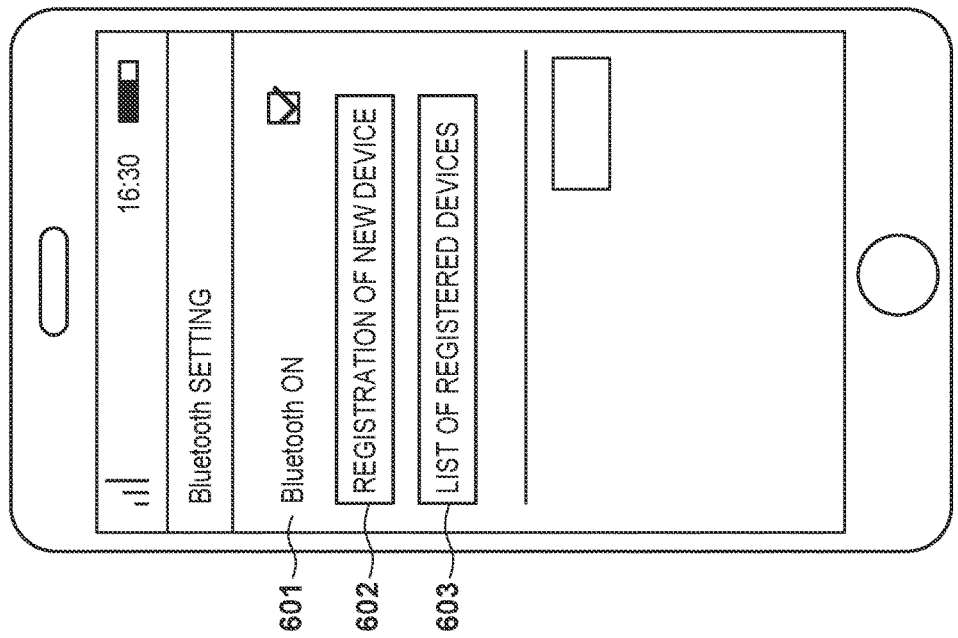

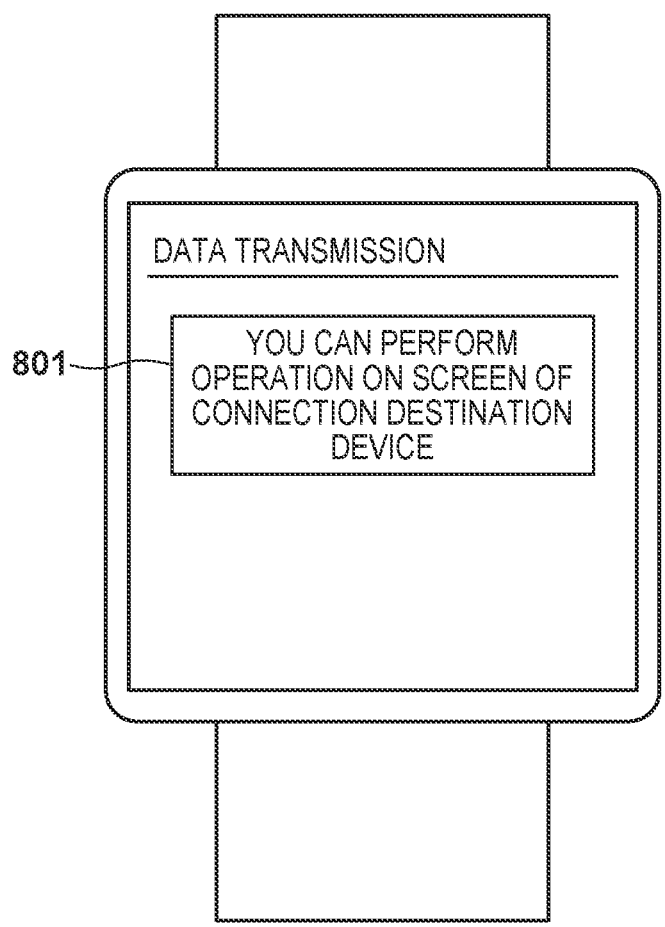

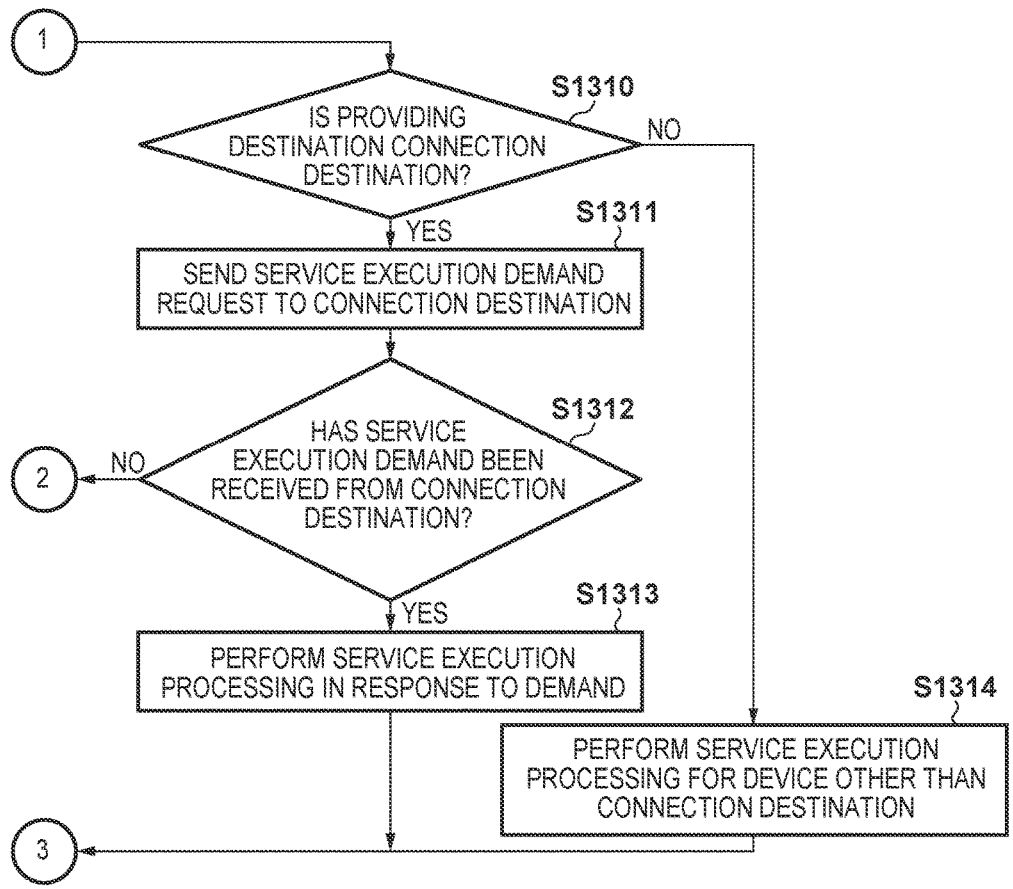

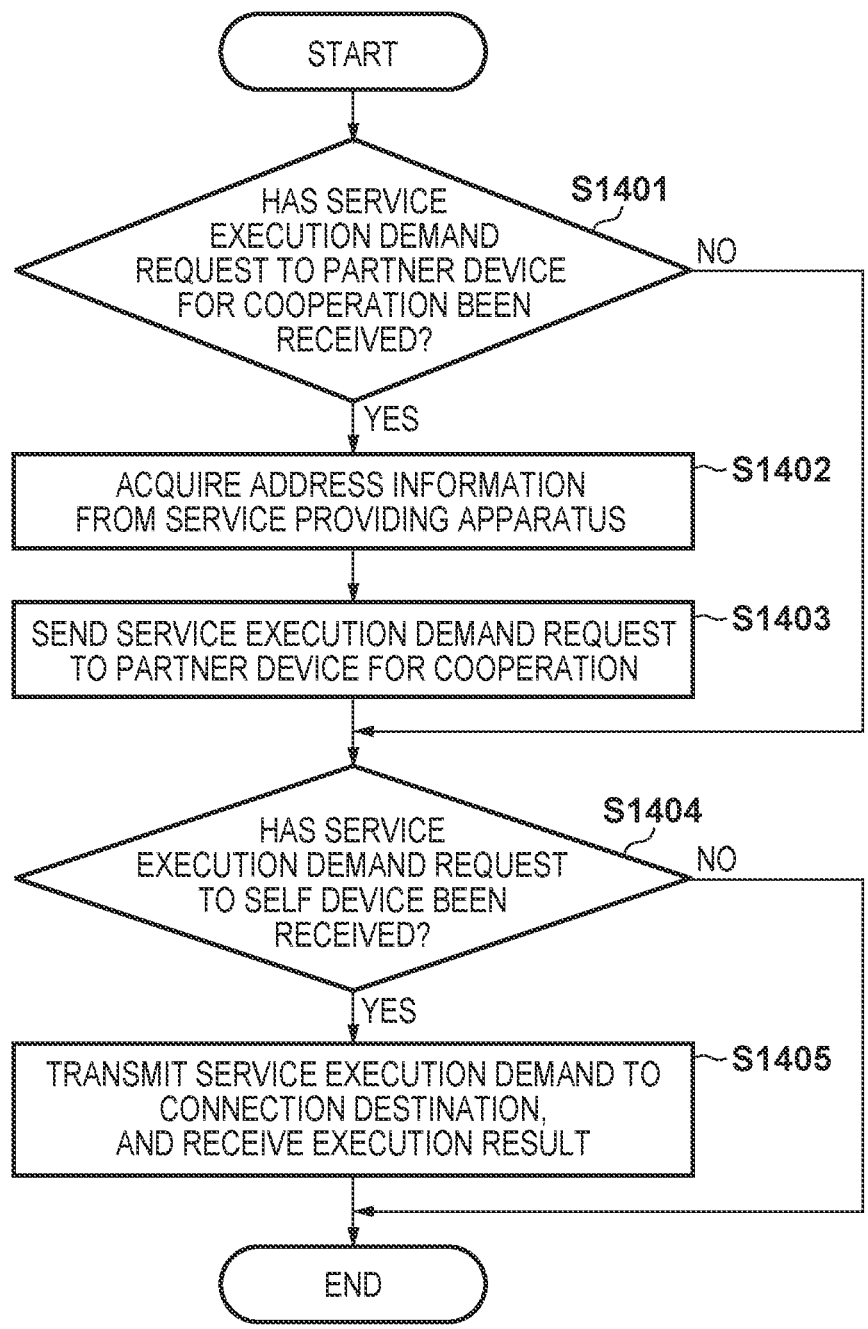

FIG. 16A

| 1601 | 1602 | 1603 | 1604 | 1605 | 1606 | 1607 | 1608 |
|---|---|---|---|---|---|---|---|
| SERIAL NUMBER | DEVICE NAME | MODEL NAME | PLATFORM | OS VERSION | Wi-Fi ADDRESS | Bluetooth ADDRESS | PARTNER DEVICE ID |
| FP1BK62MF7K3... | Watch_A | MD111J/A | WW | 110 | C8:J2:K2:16:... | C8:89:1J:32:... | 100 |

FIG. 16B

| 1610 | 1611 | 1612 | 1613 | 1614 | 1615 | 1616 | 1617 | 1618 |
|---|---|---|---|---|---|---|---|---|
| PARTNER DEVICE ID | SERIAL NUMBER | DEVICE NAME | MODEL NAME | PLATFORM | OS VERSION | Bluetooth ADDRESS | CORRESPONDING SERVICE | SAVE DESTINATION ADDRESS |
| 100 | DPS7SH2H78P2... | Mobile_A | MD222J/A | MM | 220 | C8:89:4W:81:... | Service_aaa | xxx.yyy.zzz |

FIG. 16C

| 1620 | 1621 | 1622 | 1623 | 1624 | 1625 | 1626 | 1627 | 1628 |
|---|---|---|---|---|---|---|---|---|
| SERIAL NUMBER | DEVICE NAME | MODEL NAME | PLATFORM | OS VERSION | Wi-Fi ADDRESS | Bluetooth ADDRESS | SAVE DESTINATION ADDRESS | PARTNER DEVICE ID |
| FP1BK62MF7K3... | Watch_A | MD111J/A | WW | 110 | C8:J2:K2:16:... | C8:89:1J:32:... | sss.ttt.uuu | 100 |

FIG. 17A

| 1701 | 1702 | 1703 | 1704 | 1705 | 1706 | 1707 | 1708 | 1709 | 1710 |
|---|---|---|---|---|---|---|---|---|---|
| SERIAL NUMBER | DEVICE NAME | MODEL NAME | PLATFORM | OS VERSION | Wi-Fi ADDRESS | Bluetooth ADDRESS | CORRE-SPONDING SERVICE | SAVE DESTINATION ADDRESS | PARTNER DEVICE ID |
| DPS7SE2H78P2... | Mobile_A | MD222J/A | MM | 220 | C8:J2:X8:90:... | C8:89:4W:81:... | Service_aaa | xxx.yyy.zzz | 111 |

FIG. 17B

| 1710 | 1711 | 1712 | 1713 | 1714 | 1715 | 1716 |
|---|---|---|---|---|---|---|
| PARTNER DEVICE ID | SERIAL NUMBER | DEVICE NAME | MODEL NAME | PLATFORM | OS VERSION | Bluetooth ADDRESS |
| 111 | FP1BK62MF7K3... | Watch_A | MD111J/A | WW | 110 | C8:89:1J:32:... |

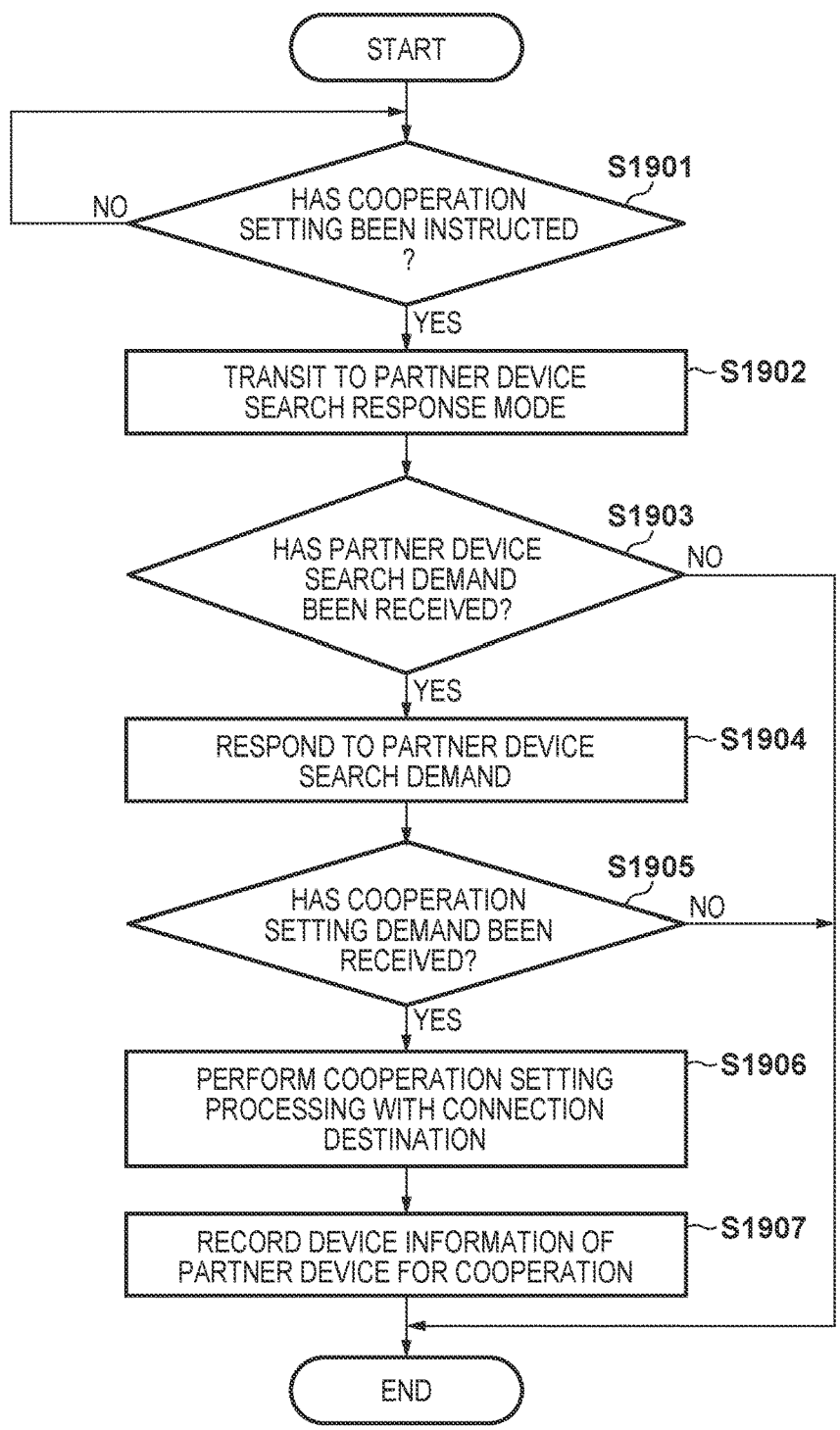

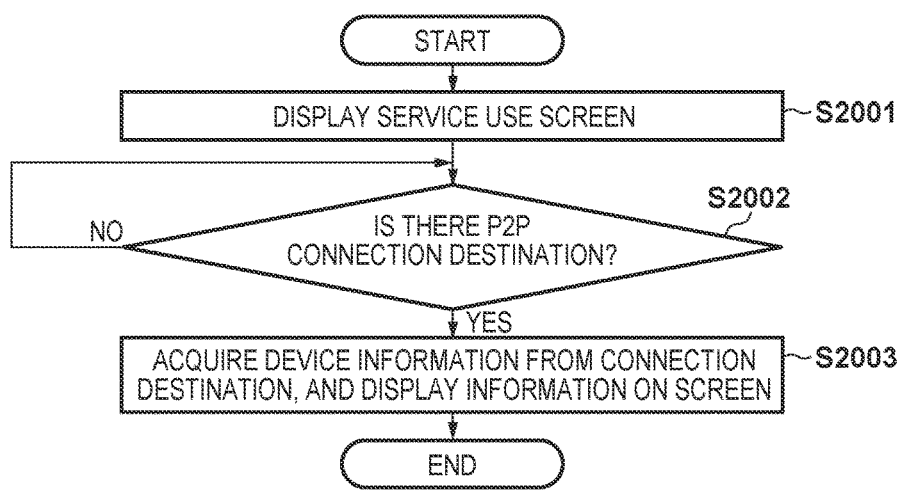
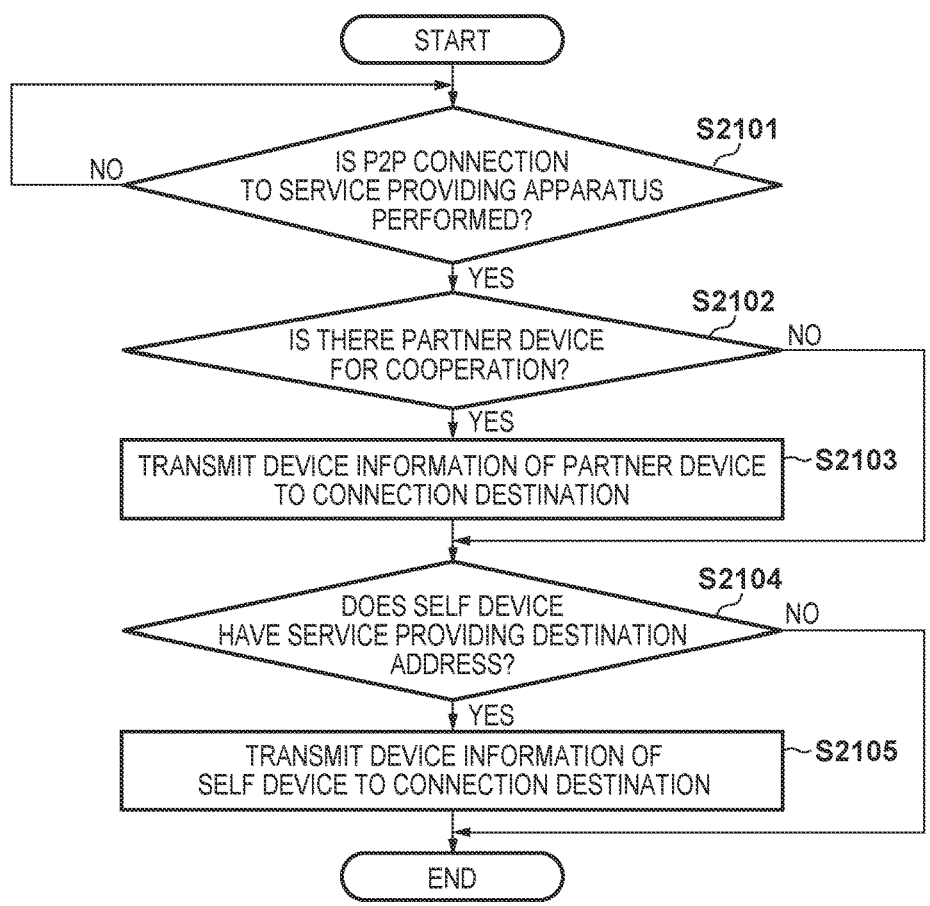

INFORMATION PROCESSING APPARATUS AND CONTROL METHOD THEREFOR, PORTABLE TERMINAL AND CONTROL METHOD THEREFOR, AND SERVICE PROVIDING SYSTEM

BACKGROUND OF THE INVENTION

Field of the Invention

The present invention relates to an information processing apparatus and a control method therefor, a wearable terminal and a control method therefor, and a service providing system including the information processing apparatus and wearable terminal.

Description of the Related Art

There are known many systems in which an information device is wirelessly connected to a service providing apparatus, and performs processing using a service provided by the service providing apparatus. When, for example, an information device incorporating an interface for an image input service is connected, by wireless communication, to an image input apparatus for providing the image input service, it becomes possible to acquire data input from the image input apparatus and save it in the information device using the image input service. Alternatively, if a data measurement apparatus for measuring/managing personal data such as a weight provides a data acquisition service capable of acquiring personal data, when an information device incorporating an interface for the data acquisition service is connected to the data measurement apparatus by wireless communication, it becomes possible to acquire the personal data from the data measurement apparatus and save it in the information device. Furthermore, in recent years, information devices superior in wearability, called wearable terminals (to be referred to as wearable information devices hereinafter), have increased. There are various forms of wearable information devices such as a wristwatch type and spectacle type. In the case of, for example, a wristwatch type information device, the user wears the device to use it. Since the wearability is important for wearable information devices, many wearable information devices have a small display region and low processing performance, as compared with general information devices. The wearable information device can perform wireless communication, and can be paired with an information device to be operated in cooperation with it. Pairing indicates authentication for one-to-one wireless communication between information devices. Mainly, an information device serves as a parent and a wearable information device serves as a child, thereby allowing one-to-one wireless communication between them. When the information devices are paired, it is possible to use the function of the information device from the wearable information device or display, on the wearable information device, notification contents received by the information device. A P2P wireless communication technique such as Bluetooth® is used for the one-to-one communication.

Japanese Patent Laid-Open No. 2015-18384 discloses a technique of displaying a list of a plurality of input sources and voice output terminals connected by wireless communication, and associating them, thereby outputting a voice of an input source from an associated output terminal.

The above-described information device incorporates an interface for a service provided by a service providing apparatus. However, a wearable information device does not always incorporate the interface for the service provided by the service providing apparatus. Consequently, while the user holds only the wearable information device incorporating no interface for the service provided by the service providing apparatus without holding the information device incorporating the interface, even if the wearable information device is connected to the service providing apparatus by wireless communication, the user cannot use the service provided by the service providing apparatus. For example, when the user attempts to use, as a service providing apparatus, an image input/output apparatus for providing the above-described image input service, even if the wearable information device incorporating no interface for the image input service can be connected to the image input/output apparatus, an operation of, for example, saving data using the image input service cannot be performed.

SUMMARY OF THE INVENTION

The present invention has been made in consideration of the above conventional example, and provides a mechanism capable of receiving a provided service even if a wearable information device, that is, a so-called wearable terminal is connected to a service providing apparatus.

The present invention has the following configuration.

According to one aspect of the present invention, there is provided an information processing apparatus capable of communicating, using predetermined wireless communication, with a portable terminal carried by a user, comprising: a detection unit configured to detect connection to the portable terminal by the predetermined wireless communication; and a display unit configured to display, when selecting a target to be provided with a function of the information processing apparatus, information of a terminal paired with the detected portable terminal as a choice of the target.

According to another aspect of the present invention, there is provided a portable terminal capable of communicating, using predetermined wireless communication, with an information processing apparatus for providing a function, comprising: a first transmission unit configured to transmit, to the information processing apparatus, information including an address of a terminal paired with the portable terminal; a second transmission unit configured to transmit, to the paired terminal, information including an address of the information processing apparatus; and a display unit configured to display, in the information processing apparatus, data indicating that execution of the function of the information processing apparatus can be started.

According to still another aspect of the present invention, there is provided a service providing system comprising: an information processing apparatus; a portable terminal capable of communicating with the information processing apparatus using predetermined wireless communication; and a terminal capable of being paired with the portable terminal, the information processing apparatus including a detection unit configured to detect connection to the portable terminal by the predetermined wireless communication, and a display unit configured to display, when selecting a target to be provided with a function of the information processing apparatus, information of a terminal paired with the detected portable terminal as a choice of the target, the portable terminal including a first transmission unit configured to transmit, to the information processing apparatus, information including an address of a terminal paired with the portable terminal, a second transmission unit configured to transmit, to the paired terminal, information including an address of the information processing apparatus, and a display unit configured to display, in the information processing apparatus, data indicating that execution of the function of the information processing apparatus can be started, and the terminal including a first reception unit configured to receive, from the portable terminal paired with the terminal, information including the address of the information processing apparatus acquired by the paired portable terminal, and store the information, and a second reception unit configured to receive data in correspondence with a function from the information processing apparatus by demanding execution of the function of the information processing apparatus.

According to the present invention, it is possible to use a service provided by a service providing apparatus, using an information device cooperating with a wearable information device.

Further features of the present invention will become apparent from the following description of exemplary embodiments with reference to the attached drawings.

BRIEF DESCRIPTION OF THE DRAWINGS

FIG. 3 is a block diagram showing examples of the software arrangements of the apparatus and respective devices forming the network system according to the present invention;

FIGS. 4A and 4B are tables each showing an example of various kinds of data used by a wearable information device according to the first embodiment;

FIGS. 5A and 5B are tables each showing an example of various kinds of data used by an information device according to the first embodiment;

FIGS. 6A and 6B are views each showing an example of the screen of the information device according to the first embodiment;

FIG. 8 is a view showing an example of the screen of the wearable information device according to the first embodiment;

FIGS. 13A and 13B shows a flowchart for explaining processing by the service providing apparatus according to the first embodiment;

FIG. 14 is a flowchart for explaining processing by the wearable information device according to the first embodiment;

FIGS. 16A, 16B, and 16C are tables each showing an example of various kinds of data used by a wearable information device according to the second embodiment;

FIGS. 17A and 17B are tables each showing an example of various kind of data used by an information device according to the second embodiment;

FIG. 19 is a flowchart for explaining processing by the wearable information device according to the second embodiment;

FIG. 20 is a flowchart for explaining processing by a service providing apparatus according to the second embodiment;

FIG. 21 is a flowchart for explaining processing by the wearable information device according to the second embodiment.

DESCRIPTION OF THE EMBODIMENTS

Embodiments of the present invention will be described below with reference to the accompanying drawings. The first embodiment will describe an example in which a service providing apparatus executes a so-called pull-type service under the control of a wearable information device (a so-called wearable terminal which may be referred to as a portable terminal hereinafter) or an information device such as a terminal. The second embodiment will describe an example in which a service providing apparatus executes a so-called push-type service without control of an information device.

First Embodiment

Figure 1:
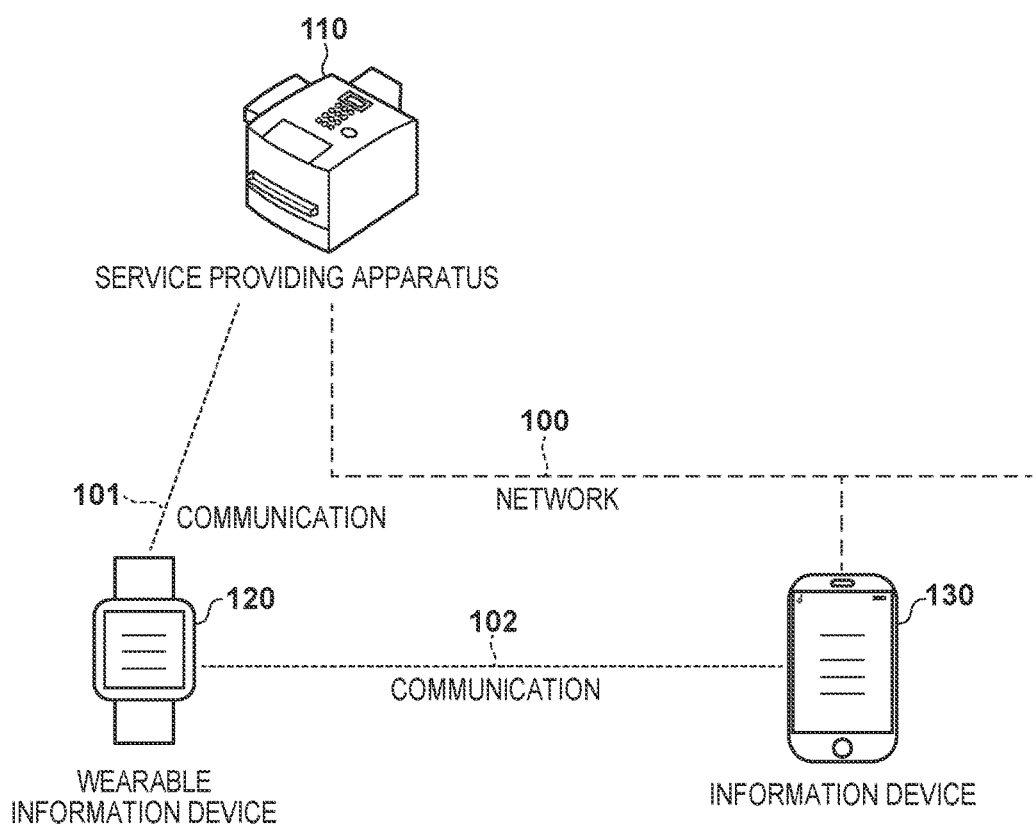
FIG. 1 is a view showing the configuration of a network system according to the present invention.

FIG. 1 is a view showing an example of the configuration of a basic network system according to the present invention. The network system includes a service providing apparatus 110, a wearable information device 120, and an information device 130. Thus, the network system may be referred to as a service providing system hereinafter. The service providing apparatus 110 and the information device 130 are connected to each other via a network 100, and can perform data communication. The wearable information device 120 can perform data communication with the service providing apparatus 110 by communication 101. The wearable information device 120 can perform data communication with the information device 130 by communication 102. The P2P wireless communication technique such as Bluetooth is used for the communication 101 or 102. Note that in this embodiment, each of the service providing apparatus 110, wearable information device 120, and information device 130 is formed by one device, but may be formed by a plurality of devices.

The service providing apparatus 110 can provide various services such as a scan service for reading an image, a print service for printing an image, and an image processing service for processing image data. In this example, the service can be referred to as a function provided by the service providing apparatus. A car or a physical information measuring apparatus for a weight and blood pressure may be included as a service providing apparatus, instead of an image forming apparatus. An apparatus for providing another service may be used, as a matter of course. The information device 130 is, for example, a computer such as a personal computer or tablet terminal, and any apparatus may be used as long as it can be connected to the service providing apparatus 110 to receive the service. The wearable information device 120 is a so-called wearable terminal, and has various shapes such as a wristwatch or spectacle. In general, the function and user interface of the wearable information device 120 are restricted or poor, as compared with the information device 130. In this embodiment, the information device 130 and the wearable information device 120 are different in that the information device 130 includes an interface for receiving the service provided by the service providing apparatus 110 while the wearable information device 120 can be connected to the service providing apparatus 110 but includes no interface for receiving the service. Furthermore, the wearable information device 120 can also be connected to the information device 130. That is, the wearable information device 120 according to this embodiment is an information device which can be connected to the information device 130 and service providing apparatus 110 but includes no interface for receiving the service provided by the service providing apparatus 110. This type of information device will be referred to as a wearable information device or a wearable terminal in this embodiment. Therefore, the wearable information device 120 for a given service can be used as the information device 130 for a different service. Note that the information device 130 which can receive the service from the service providing apparatus 110 may be simply referred to as a terminal hereinafter. The service providing apparatus 110 may be referred to as a server hereinafter. Furthermore, the service providing apparatus 110 also serves as an information processing apparatus for processing information, and may thus be referred to as an information processing apparatus hereinafter.

<Hardware Arrangement>

Figure 2A:
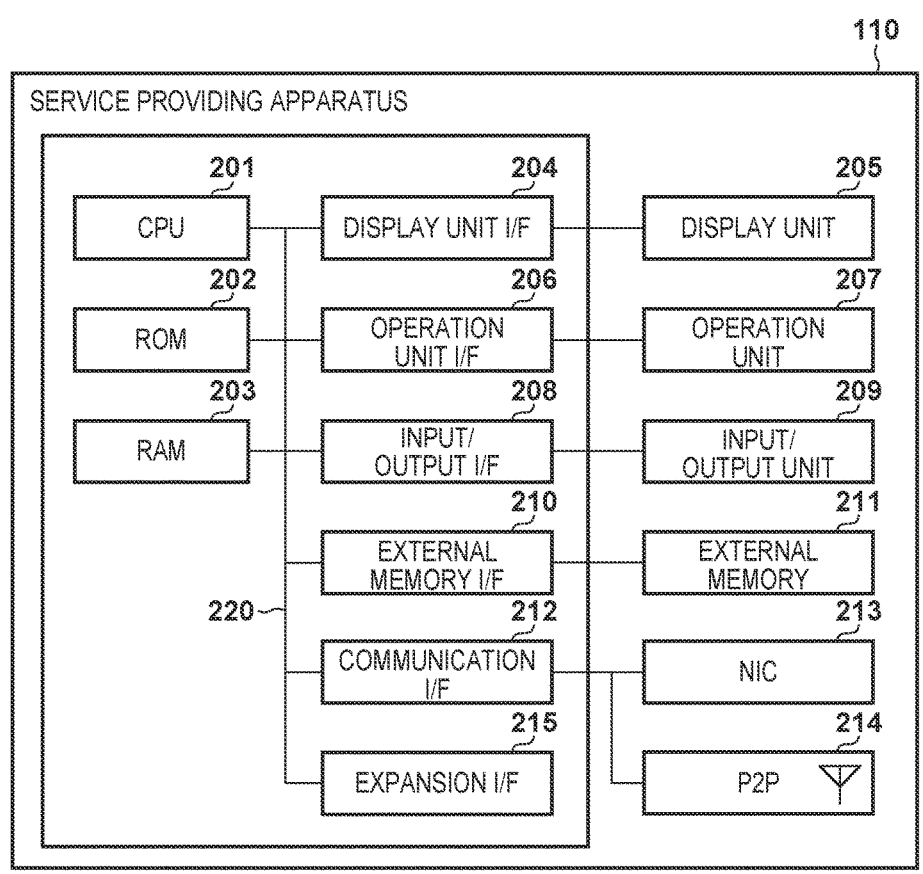
FIGS. 2A and 2B are block diagrams respectively showing the hardware arrangements of an apparatus and respective devices forming the network system according to the present invention.
Figure 2B:
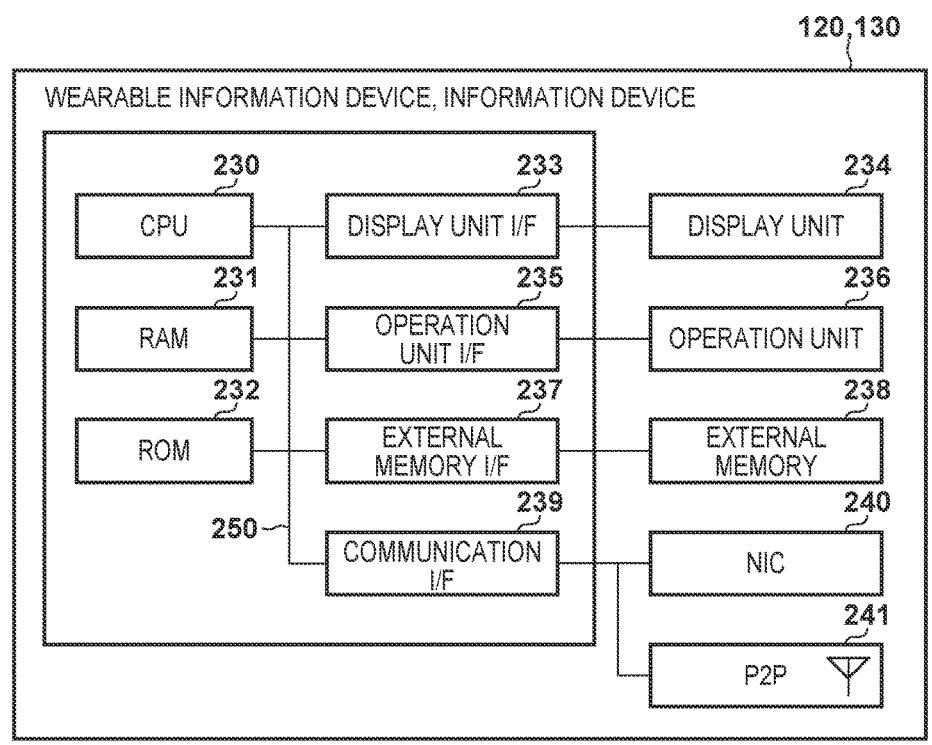

The hardware arrangements of the apparatus and respective devices forming the network system will be described next. FIGS. 2A and 2B are block diagrams respectively showing examples of hardware arrangements of the apparatus and respective devices forming the network system.

FIG. 2A is a block diagram showing an example of the hardware arrangement of the service providing apparatus 110. A CPU 201 comprehensively controls respective devices connected to a system bus 220 in accordance with programs stored in a ROM 203 serving as a storage unit. A RAM 202 functions as a main memory, a work area, and the like for the CPU 201, and is also used as an input information loading area and environment data storage area. The ROM 203 stores a control program to be executed by the CPU 201, and various kinds of data. A display unit I/F 204 controls an interface with a display unit 205. An operation unit I/F 206 controls an interface with an operation unit 207 formed by buttons, a touch panel, and the like. An input/output I/F 208 controls an interface with an input/output unit 209. The input/output unit 209 inputs/outputs measurement data, image data, and the like. An external memory I/F 210 controls access to an external memory 211 such as a flash memory or SSD (Solid State Disk). The external memory 211 functions as a savable or readable storage medium, and stores an operating system (OS) and applications. A communication I/F 212 controls communications of NIC 213 and P2P 214. The NIC 213 serves as a connection I/F to a wired or wireless network, and controls transmission/reception of data to/from the information device 130. This example assumes that the wireless network (wireless LAN) is used. The P2P 214 serves as a connection I/F for performing P2P (peer-to-peer) communication, and controls transmission/reception data to/from the wearable information device 120. The P2P 214 serves as a wireless I/F for, for example, Bluetooth® or NFC in this embodiment but may serve as a wired I/F. This example assumes that Bluetooth is used. An expansion I/F 215 is a function expansion interface, and can perform function expansion or the like by connecting an expansion unit. Processing to be described in this embodiment is implemented by loading a program recorded in the external memory 211 into the RAM 202 and executing it by the CPU 201. Note that the program may be stored in the RAM 202 or ROM 203 instead of the external memory 211. Note that an image input/output apparatus has been exemplified as the service providing apparatus 110 shown in FIG. 2A. A data measurement apparatus or the like may be used.

FIG. 2B is a block diagram showing an example of the hardware arrangement of the wearable information device 120 or the information device 130. A CPU 230 comprehensively controls respective devices connected to a system bus 250 in accordance with programs stored in a ROM 232 serving as a storage unit. A RAM 231 functions as a main memory, a work area, and the like for the CPU 230, and is also used as an input information loading area and environment data storage area. The ROM 232 stores a control program to be executed by the CPU 230, and various kinds of data. A display unit I/F 233 controls an interface with a display unit 234. An operation unit I/F 235 controls an interface with an operation unit 236 formed by buttons, a touch panel, a keyboard, and the like. An external memory I/F 237 controls access to an external memory 238 such as a flash memory or SSD (Solid State Disk). The external memory 238 functions as a savable or readable storage medium, and stores an operating system (OS) and applications. A communication I/F 239 controls communications of NIC 240 and P2P 241. The NIC 240 serves as a connection I/F to the network, and controls transmission/reception of data between the information device 130 and the service providing apparatus 110. The P2P 241 serves as a wireless I/F for performing P2P communication, and controls transmission/reception of data between the wearable information device 120 and the information device 130 or between the wearable information device 120 and the service providing apparatus 110. Processing to be described in this embodiment is implemented by loading a program recorded in the external memory 238 into the RAM 231, as needed, and executing it by the CPU 230. Note that the program may be stored in the RAM 231 or ROM 232 instead of the external memory 238. Note that Bluetooth®, especially BLE (Bluetooth Low Energy) with low power consumption or the like is used as the P2P 241.

Note that a wristwatch type information device has been exemplified as the wearable information device 120 shown in FIG. 2B. However, a spectacle type information device, a ring type information device, a card type information device, or the like may be adopted. Furthermore, a mobile terminal has been exemplified as the information device 130. However, a tablet terminal, a personal computer, or the like may be adopted.

<Software Arrangement of Service Providing Apparatus 110>

The software arrangements and functions of the apparatus and respective devices of the network system will be described next. FIG. 3 shows the software arrangements of the apparatus and respective devices forming the network system. Programs for implementing the functions of respective software arrangements shown in FIG. 3 are stored in the ROMs 203 and 232 of the apparatus and respective devices. The CPUs 201 and 230 load the programs into the RAMs 202 and 231 and execute them, thereby implementing the functions.

The service providing apparatus 110 includes a communication unit 310, a control unit 311, an input/output unit 312, a display/operation unit 313, and a data storage unit 314. The communication unit 310 includes a communication module complying with a communication method with the wearable information device 120 and the information device 130. This communication module is compatible with an interface for performing data communication with the wearable information device 120 and information device 130, and can perform data communication with the communication modules of the wearable information device 120 and information device 130. The control unit 311 acquires device information from the wearable information device 120 via the communication unit 310, and sends a display instruction to the display/operation unit 313. The control unit 311 also transmits, to the wearable information device 120 via the communication unit 310, information of an address connectable to a service of itself, and performs service execution processing in response to a demand from the wearable information device 120 or information device 130. In response to an instruction from the control unit 311, the input/output unit 312 performs input/output processing executed in the service execution processing. The display/operation unit 313 performs display processing in accordance with an instruction from the control unit 311 or response processing in accordance with a user operation. Device information such as the device name and address information of the service providing apparatus 110 is recorded in the data storage unit 314. In addition, device information of an authenticated information device with which the service providing apparatus 110 can perform P2P communication may be recorded.

<Software Arrangement of Wearable Information Device 120>

The wearable information device 120 includes a communication unit 320, a control unit 321, a display/operation unit 322, and a data storage unit 323. The communication unit 320 includes a communication module complying with a communication method with the service providing apparatus 110 and the information device 130. This communication module is compatible with an interface for performing data communication with the service providing apparatus 110 and information device 130, and can perform data communication with the communication modules of the service providing apparatus 110 and information device 130. The control unit 321 is connected to the information device 130 via the communication unit 320, and performs cooperation setting processing. The control unit 321 also transmits device information of itself or the information device 130 as a partner device for cooperation to the service providing apparatus 110 via the communication unit 320. The control unit 321 receives a service execution request from the service providing apparatus 110 via the communication unit 320, and sends a service execution demand to the service providing apparatus 110 or sends a service execution request to the information device 130 as a partner device for cooperation. The display/operation unit 322 performs display processing in accordance with an instruction of the control unit 321 or response processing in accordance with a user operation. In addition to device information of the wearable information device 120, device information of the information device 130 for which cooperation setting has been made is recorded in the data storage unit 323.

Note that cooperation is also called pairing. In the cooperation setting processing, for example, one-to-one wireless communication between the information devices is authenticated, and the devices recognize one another as a cooperation partner, and exchange necessary information, thereby establishing cooperation. A state in which the cooperation setting processing is complete and the information devices cooperate with each other will also be referred to as a paired state hereinafter.

<Device Information of Wearable Information Device 120>

FIG. 4A shows an example of the device information of the wearable information device 120 recorded in the data storage unit 323. The device information includes a serial number 401, device name 402, model name 403, platform 404, OS version 405, Wi-Fi address 406, Bluetooth address 407, and partner device ID 408 which is an ID of a partner device for cooperation. The serial number 401 is a number capable of uniquely identifying the wearable information device 120. The device name 402 is a name representing the wearable information device 120, and can be changed to an arbitrary name by the user. The model name 403 is information indicating the model name of the wearable information device 120. The platform 404 is information indicating a platform incorporated in the wearable information device 120, and can be used to distinguish between the wearable information device and the information device. The OS version 405 is version information of an OS incorporated in the wearable information device 120. The Wi-Fi address 406 is address information for specifying the wearable information device 120 on the network and performing connection to it, and is used by another device or apparatus connected to the network to specify the wearable information device 120 and perform connection to it. The Bluetooth address 407 is address information to be used to perform connection to the wearable information device 120 by P2P communication, and is used to perform P2P communication with the service providing apparatus 110 or the information device 130. The partner device ID 408 is an ID (or identification information) indicating the information device 130 for which cooperation setting has been made, and records, if there is an information device for which cooperation setting has been made, an ID linked with device information of the information device. In this example, a partner device ID 410 shown in FIG. 4B is recorded.

FIG. 4B shows an example of the device information, recorded in the data storage unit 323, of the information device 130 for which cooperation setting has been made. The device information includes the partner device ID 410, a serial number 411, a device name 412, a model name 413, a platform 414, an OS version 415, a Bluetooth address 416, and a corresponding service 417. The partner device ID 410 is an identification number linked with the device information of the information device for which cooperation setting has been made, and is issued/managed for each piece of device information of an information device for which cooperation setting has been made. The serial number 411 is a number capable of uniquely identifying the information device 130. The device name 412 is a name representing the information device 130. The model name 413 is information indicating the model name of the information device 130. The platform 414 is information indicating a platform incorporated in the information device 130, and can be used to distinguish between the wearable information device and the information device. The OS version 415 is version information of an OS incorporated in the information device 130. The Bluetooth address 416 is address information to be used to perform connection to the information device 130 by P2P communication. The corresponding service 417 is information indicating a service of the service providing apparatus 110, which is supported by the information device 130. If the information device 130 can use a service of the service providing apparatus 110, information indicating the service is recorded. If, for example, the service providing apparatus 110 provides a data transfer service, and an application capable of using the service is installed in the information device 130, (Service_aaa) is recorded as information indicating the data transfer service.

<Software Arrangement of Information Device 130>

The information device 130 includes a communication unit 330, a control unit 331, a display/operation unit 332, and a data storage unit 333. The communication unit 330 includes a communication module complying with a communication method with the service providing apparatus 110 and wearable information device 120. This communication module is compatible with an interface for performing data communication with the service providing apparatus 110 and wearable information device 120, and can perform data communication with the communication modules of the service providing apparatus 110 and wearable information device 120. The control unit 331 is connected to the wearable information device 120 via the communication unit 330, and performs cooperation setting processing. The control unit 331 also receives a service execution request to the service providing apparatus 110 from the wearable information device 120 via the communication unit 330, and sends a service execution demand to the service providing apparatus 110. The display/operation unit 332 performs display processing in accordance with an instruction from the control unit 331 or response processing in accordance with a user operation. In addition to the device information of the information device 130, the device information of the wearable information device 120 for which cooperation setting has been made is recorded in the data storage unit 333.

<Device Information of Information Device 130>

FIG. 5A shows an example of the device information of the information device 130 recorded in the data storage unit 333. The device information includes a serial number 501, device name 502, model name 503, platform 504, OS version 505, Wi-Fi address 506, Bluetooth address 507, corresponding service 508, and partner device ID 509. The serial number 501, device name 502, model name 503, platform 504, OS version 505, and Bluetooth address 507 are the same as the serial number 411, device name 412, model name 413, platform 414, OS version 415, and Bluetooth address 416, respectively, which have been described with reference to FIG. 4B. The Wi-Fi address 506 is address information to be used to specify the information device 130 on the network and perform connection to it, and is used by another device or apparatus connected to the network to specify the information device 130 and perform connection to it. The corresponding service 508 is information indicating a service of the service providing apparatus 110, which is supported by the information device 130. If the information device 130 can use a service of the service providing apparatus 110, information indicating the service is recorded. If, for example, the service providing apparatus 110 provides the data transfer service, and an application capable of using the service is installed in the information device 130, Service_aaa is recorded as information indicating the data transfer service. The partner device ID 509 is an ID indicating the wearable information device 120 for which cooperation setting has been made, and records, if there is an information device for which cooperation setting has been made, an ID linked with device information of the information device. In this example, a partner device ID 510 shown in FIG. 5B is recorded.

FIG. 5B shows an example of the device information, recorded in the data storage unit 333, of the wearable information device 120 for which cooperation setting has been made. The device information includes the partner device ID 510, a serial number 511, a device name 512, a model name 513, a platform 514, an OS version 515, and a Bluetooth address 516. The partner device ID 510 is an identification number linked with the device information of the information device for which cooperation setting has been made, and issued/managed for each piece of device information of an information device for which cooperation setting has been made. The serial number 511, device name 512, model name 513, platform 514, OS version 515, and Bluetooth address 516 are the same as the serial number 401, device name 402, model name 403, platform 404, OS version 405, and Bluetooth address 407, respectively, which have been described with reference to FIG. 4A. The software arrangements and functions of the apparatus and respective devices have been described above.

<Cooperation Setting Processing Procedure by Information Device 130>

The sequence of processing in which the information device 130 makes cooperation setting for the wearable information device 120 will be described next with reference to FIG. 9.

In step S901, the control unit 331 of the information device 130 determines whether a partner device search instruction has been sent via the display/operation unit 332. FIG. 6A shows an example of a screen for sending a partner device search instruction, which is displayed on the display/operation unit 332. A communication setting display field 601 displays a setting of enabling/disabling of P2P communication necessary to perform cooperation setting. A search instruction button 602 is a button for sending a partner device search instruction. When the button 602 is pressed, it is determined that a partner device search instruction is sent. A display instruction button 603 is a button for instructing to display a list of information devices for which cooperation setting has been made. If it is determined in step S901 that a partner device search instruction has been sent, an information device as a partner device for cooperation is searched for and a search result screen is displayed in step S902. The partner device for cooperation indicates a partner device for which cooperation setting is already complete, that is, a paired partner device. An information device as a partner device for cooperation is searched for by transmitting a search demand by P2P communication, and receiving a response from an information device capable of performing P2P communication. The response includes part (for example, the device name 402 shown in FIG. 4A) of device information of the information device. FIG. 6B shows an example of the search result screen displayed on the display/operation unit 332. Information indicating an information device which has responded to the search demand is displayed in a device field 610. In step S903, the control unit 331 determines whether execution of cooperation setting has been instructed via the display/operation unit 332. With reference to the example of FIG. 6B, when a checkbox 611 is turned on, it is determined that execution of cooperation setting with the wearable information device designated by the setting is instructed. If YES is determined in step S903, the process advances to step S904. In step S904, the control unit 331 performs connection to the information device for which execution of cooperation setting has been instructed, and executes cooperation setting processing. The cooperation setting processing is performed by transmitting a cooperation setting demand to the information device by P2P communication, and exchanging authentication information in accordance with a response. Manually input information or prerecorded information is used as authentication information. Furthermore, the control unit 331 acquires device information from the information device as a partner device for cooperation, and transmits device information of itself to the information device as a partner device for cooperation. The device information of itself is recorded in the data storage unit 333. FIG. 5A shows an example of the device information of the information device 130 recorded in the data storage unit 333. FIG. 5A is as described above. In step S905, the control unit 331 records, in the data storage unit 333, the device information of the information device for which cooperation setting has been made. FIG. 5B shows an example of the device information, recorded in the data storage unit 333, of the wearable information device 120 for which cooperation setting has been made. FIG. 5B is as described above. A cooperation setting method is not limited to this. For example, a method of displaying a wearable information device using the camera (not shown) of an information device and making cooperation setting or the like may be used.

<Cooperation Setting Processing Procedure by Wearable Information Device 120>

The sequence of processing in which the wearable information device 120 is set to cooperate with the information device 130 will be described with reference to FIG. 10.

In step S1001, the control unit 321 of the wearable information device 120 determines whether cooperation setting has been instructed via the display/operation unit 322. Whether cooperation setting has been instructed is determined in accordance with, for example, whether the cooperation setting button displayed on the display/operation unit 322 of the wearable information device 120 has been pressed. If YES is determined in step S1001, the process advances to step S1002. In step S1002, the control unit 321 transits to a partner device search response mode. In the partner device search response mode, according to the procedure of step S1003 and subsequent steps, upon receiving a search demand transmitted from the information device 130, the control unit 321 returns a response to it. A time-out value is set for the partner device search response mode. When a time corresponding to the time-out value elapses, the partner device search response mode is canceled. More specifically, in step S1003, the control unit 321 determines whether the search demand transmitted from the information device 130 in step S902 has been received via the communication unit 320. In step S1003, the control unit 321 stands by for reception of the search demand by setting the above-described time-out value as a time limit. If the search demand is not received within the time limit, the process ends. If it is determined that the search demand has been received within the time limit, the process advances to step S1004, and the control unit 321 returns a response to the search demand via the communication unit 330. The response includes part (for example, the device name 402 shown in FIG. 4A) of the device information of itself. In step S1005, the control unit 321 determines whether the cooperation setting demand transmitted from the information device 130 in step S904 has been received via the communication unit 320. If it is determined that the cooperation setting demand has been received, the control unit 321 performs cooperation setting processing with the information device 130 in step S1006. The cooperation setting processing is performed by exchanging authentication information in accordance with the response to the cooperation setting demand transmitted from the information device 130. Manually input information or prerecorded information is used as authentication information. The control unit 321 acquires the device information from the information device 130, and transmits the device information of itself to the information device 130. The device information of itself is recorded in the data storage unit 323. FIG. 4A shows an example of the device information of the wearable information device 120 recorded in the data storage unit 323. FIG. 4A is as described above. In step S1007, the control unit 321 records, in the data storage unit 323, the device information of the information device for which cooperation setting has been made. FIG. 4B shows an example of the device information, recorded in the data storage unit 323, of the information device 130 for which cooperation setting has been made. FIG. 4B is as described above.

<Service Use Screen Display Processing>

The sequence of processing in which the service providing apparatus 110 displays, on a service use screen, the device information acquired from the wearable information device 120 connected by P2P communication will be described with reference to FIG. 11.

In step S1101, the control unit 311 instructs the display/operation unit 313 to display the service use screen. In step S1102, the control unit 311 determines whether there is an information device connected by P2P communication via the communication unit 310. In other words, the control unit 311 detects P2P connection to an information device. To perform connection to an information device by P2P communication, it is necessary to perform authentication processing by exchanging authentication information by P2P communication. If it is determined that there is an information device connected by P2P communication, the process advances to step S1103. In step S1103, the control unit 311 acquires the device information from the wearable information device 120 connected by P2P communication via the communication unit 310. The control unit 311 instructs the display/operation unit 313 to display the acquired device information on the service use screen. The acquired device information includes the device information of the wearable information device 120 and the device information of the information device 130 with which the wearable information device 120 has been set to cooperate. The device information includes information such as the device name 402 shown in FIG. 4A or the device name 412 shown in FIG. 4B.

Figure 7A:
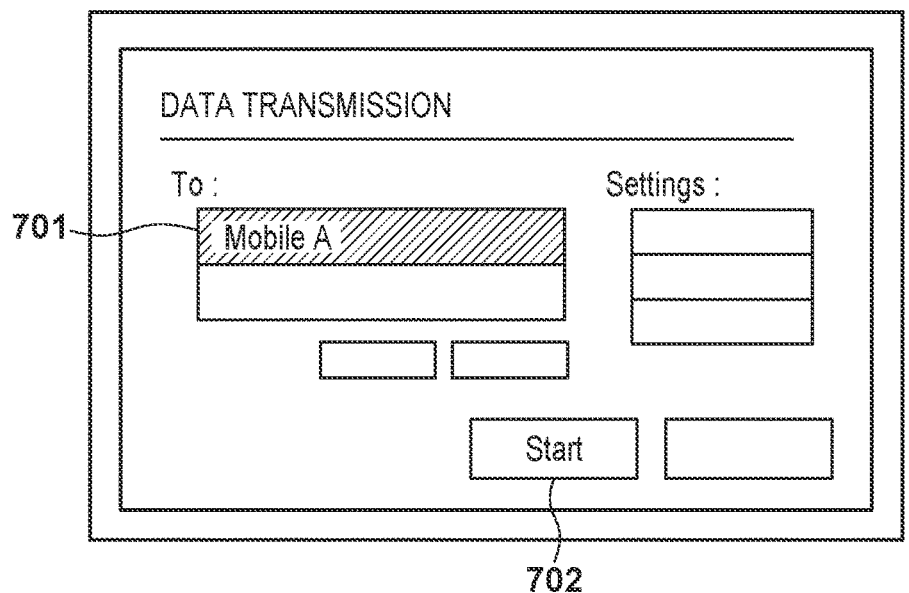
FIGS. 7A and 7B are views each showing an example of the screen of a service providing apparatus according to the first embodiment.

FIG. 7A shows an example of the service use screen where the device information of the information device 130 with which the wearable information device 120 connected to the service providing apparatus 110 by P2P communication has been set to cooperate is displayed. In a choice 701, the device name included in the device information of the information device 130 with which the wearable information device 120 connected by P2P communication has been set to cooperate is displayed as a service providing destination. The service providing destination indicates a device to which a service is to be provided.

Figure 7B:
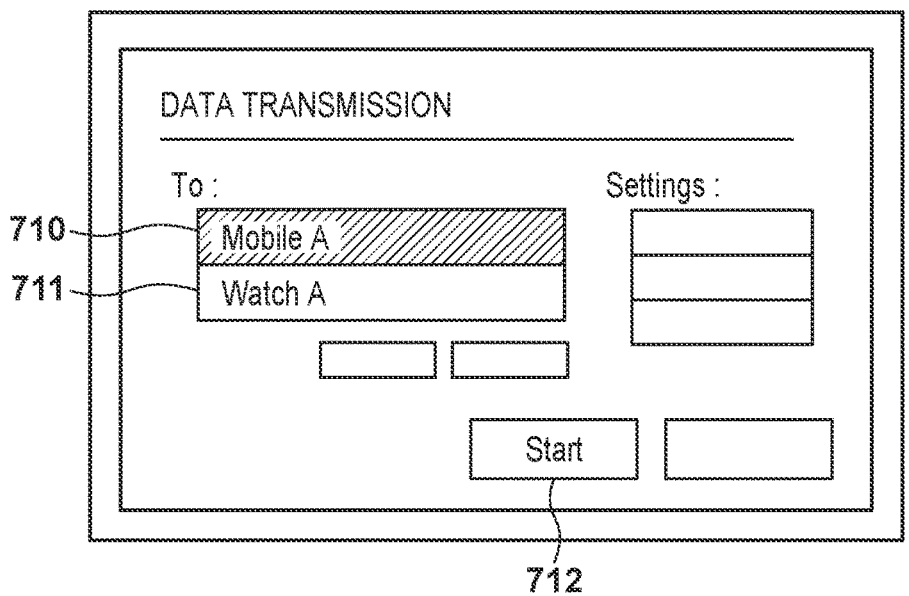

FIG. 7B shows an example of the service use screen where the device information of the wearable information device 120 connected to the service providing apparatus 110 by P2P communication and the device information of the information device 130 with which the wearable information device 120 has been set to cooperate are displayed as choices of service providing destination devices. The device name included in the device information of the information device 130 with which the wearable information device 120 connected by P2P communication has been set to cooperate is displayed as a service providing destination candidate in a choice 710, and the device name included in the device information of the wearable information device 120 connected by P2P communication is displayed as a service providing destination candidate in a choice 711. As described above, a list of information devices (devices) satisfying the condition that the service is usable is displayed as choices on the user interface of the service use screen of the service providing apparatus 110. A device selected from the choices is determined as a service providing destination.

Whether to display the device information may be determined based on information included in the acquired device information. For example, only device information which can use the service provided by the service providing apparatus 110 may be displayed based on information of a corresponding service included in the acquired device information. In the example of FIG. 4B described above, if the information of the corresponding service 417 included in the acquired device information coincides with the information (Service_aaa) indicating the service provided by the service providing apparatus 110, the device information is displayed.

Furthermore, only if it is determined that the distance to the information device connected by P2P communication is short, the device information may be displayed. For example, only if distance information to the information device is acquired using a mechanism such as iBeacon, and the distance to the information device is short (for example, the distance is shorter than a predetermined threshold), it is determined that the user holding the information device is in a range where he/she can operate the service providing apparatus 110, thereby displaying the device information.

<Connection Processing from Wearable Information Device to Service Providing Apparatus>

The sequence of processing in which the wearable information device 120 is connected to the service providing apparatus 110 by P2P communication will be described with reference to FIG. 12. FIG. 12 may be executed in response to, for example, a demand to acquire the device information from the service providing apparatus 110 in step S1103 of FIG. 11.

In step S1201, the control unit 321 of the wearable information device 120 determines whether to perform connection to the service providing apparatus 110 by P2P communication. As a method of performing connection to the service providing apparatus 110 by P2P communication, there are provided a method of sending an instruction from a screen displayed on the display/operation unit 322 of the wearable information device 120, finding the service providing apparatus 110 by P2P communication, and performing connection to it, and a method of automatically performing connection by P2P communication when the device enters a range where P2P communication is possible. To perform connection, it is necessary to perform authentication processing by exchanging authentication information. To automatically perform connection, it is necessary to exchange and store authentication information in advance.

If YES is determined in step S1201, the control unit 321 determines in step S1202 whether there is the information device 130 for which cooperation setting has been made. Whether there is the information device 130 for which cooperation setting has been made is determined based on the device information, recorded in the data storage unit 323, of the information device 130 for which cooperation setting has been made. If the device information of the information device 130 for which cooperation setting has been made is recorded in the data storage unit 323, YES is determined. Furthermore, determination of whether the information device 130 for which cooperation setting has been made can use the service provided by the connected service providing apparatus 110 may be added. In the example of FIG. 4B described above, if the information (Service_aaa) indicating the service provided by the connected service providing apparatus 110 coincides with the information of the corresponding service 417, YES is determined. Furthermore, determination of whether connection to the information device 130 for which cooperation setting has been made can be performed by P2P communication via the communication unit 320 may be added. In this case, if the communication unit 320 can be connected to the information device 130 by P2P communication, YES is determined. Furthermore, determination of whether the information device 130 for which cooperation setting has been made can be connected to the service providing apparatus 110 may be added. In this case, the control unit 321 transmits, via the communication unit 320, to the information device 130 for which cooperation setting has been made, the information of the address connectable to the service of the service providing apparatus 110, and requests a connection test. If a response indicating success is received from the information device 130 as a result of the connection test, YES is determined.

If YES is determined in step S1202, the process advances to step S1203; otherwise, the process advances to step S1204. In step S1203, the control unit 321 transmits, via the communication unit 320, to the service providing apparatus 110 connected by P2P communication, the device information of the information device 130 for which cooperation setting has been made. In the example of FIG. 4B described above, only the device name 412 may be transmitted, or the device name 412 may be transmitted by including other information such as the model name 413. In step S1204, the control unit 321 determines whether the wearable information device 120 can use the service provided by the service providing apparatus 110. If, for example, the service providing apparatus 110 provides the data transfer service, and an application capable of using the service is installed in the wearable information device 120, YES is determined. If YES is determined in step S1204, the process advances to step S1205. In step S1205, the control unit 321 transmits the device information of itself to the service providing apparatus 110 connected by P2P communication. In the example of FIG. 4A described above, only the device name 402 may be transmitted, or the device name 402 may be transmitted by including other information such as the model name 403. Note that if the control unit 321 has already transmitted the device information of itself in step S1201 at the time of connection to the service providing apparatus 110, it need not transmit the device information again in step S1205 in some cases.

If a service execution instruction can be sent from the service use screen displayed on the service providing apparatus 110 connected by P2P communication, the display/operation unit 322 of the wearable information device 120 may display a message indicating that an operation can be performed on the screen of the service providing apparatus 110. FIG. 8 shows an example of a screen displayed on the display/operation unit 322 of the wearable information device 120. If an instruction to use the service of the service providing apparatus 110 is sent on the screen displayed on the display/operation unit 322, a message 801 indicating that an operation can be performed on the screen of the service providing apparatus 110 is displayed. This has the effect of improving the operability by prompting the user to use the display unit and operation unit of the service providing apparatus 110 when the display region of the wearable information device 120 is small and the operability is poor.

<Service Execution Processing by Service Providing Apparatus>

A sequence of performing service execution processing in the service providing apparatus 110 will be described with reference to FIGS. 13A and 13B.

In step S1301, the control unit 311 of the service providing apparatus 110 determines whether service execution has been instructed on the service use screen via the display/operation unit 313. When a start button 702 in the example of FIG. 7A described above or a start button 712 in the example of FIG. 7B described above is pressed, YES is determined. If YES is determined in step S1301, the process advances to step S1302. In step S1302, the control unit 311 determines whether a service providing destination instructed via the display/operation unit 313 is the information device 130 which has been set to cooperate with the connected wearable information device 120. If the service providing destination 701 has been selected in the example of FIG. 7A described above, or the service providing destination 710 has been selected in the example of FIG. 7B described above, YES is determined. Since the device information of the wearable information device 120 connected to the service providing apparatus 110 and the device information of the information device 130 cooperating with the wearable information device 120 are distinguishably acquired and saved, the selected service providing destination can be determined in step S1302. If YES is determined in step S1302, the process advances to step S1303; otherwise, the process advances to step S1310. In step S1303, the control unit 311 transmits, to the wearable information device 120 connected by P2P communication via the communication unit 310, a service execution demand request to the information device 130 which has been set to cooperate with the wearable information device 120. The service execution demand request is a message or command to request issuance of a service execution demand. In step S1304, in response to the demand from the connected wearable information device 120, the control unit 311 transmits the information of the address connectable to the service of the service providing apparatus 110. The information device 130 for which cooperation setting has been made is notified of this address information via the wearable information device 120. In step S1305, the control unit 311 determines whether the service execution demand has been received from the information device 130 with which the wearable information device 120 connected via the communication unit 310 has been set to cooperate. If YES is determined in step S1305, the process advances to step S1306; otherwise, the process advances to step S1307 to perform cancellation processing. In step S1306, the control unit 311 performs service execution processing in response to the demand from the information device 130. In the case of, for example, the data transfer service, in response to the service execution demand from the information device 130, the input/output unit 312 is controlled to generate data, and the data is transmitted to the information device 130. In this case, therefore, the information device 130 and the service providing apparatus 110 directly communicate with each other via the network 100. The same applies to communication with the information device 130 in steps S1303 to S1306 in addition to step S1306.

In step S1310, the control unit 311 determines whether the service providing destination instructed via the display/operation unit 313 is the connected wearable information device 120. In the example of FIG. 7B described above, if the service providing destination 711 has been selected, YES is determined. If YES is determined in step S1310, the process advances to step S1311; otherwise, the process advances to step S1314. In step S1311, the control unit 311 sends a service execution demand request to the wearable information device 120 connected to the service providing apparatus 110 by P2P communication via the communication unit 310. In step S1312, the control unit 311 determines whether the service execution demand has been received from the connected wearable information device 120 via the communication unit 310. If YES is determined in step S1312, the process advances to step S1313; otherwise, the process advances to step S1314. In step S1313, in response to the service execution demand from the wearable information device 120, the control unit 311 performs service execution processing. In the case of, for example, the data transfer service, in response to the demand from the wearable information device 120, the input/output unit 312 is controlled to generate data, and the data is transmitted to the wearable information device 120. In step S1314, the service providing destination is another information device, and thus service execution processing is performed for the other instructed information device.

<Service Execution Demand by Wearable Information Device>

A sequence of performing processing by the wearable information device 120 in response to the service execution demand request from the service providing apparatus 110 will be described with reference to FIG. 14. FIG. 14 is executed in response to, for example, reception of the service execution demand request transmitted in step S1303 or S1311 of FIGS. 13A and 13B.

In step S1401, the control unit 321 of the wearable information device 120 determines whether the service execution demand request to the information device 130 for which cooperation setting has been made has been received from the service providing apparatus 110 via the communication unit 320. If YES is determined in step S1401, the process advances to step S1402; otherwise, the process advances to step S1404. In step S1402, the control unit 321 acquires, from the service providing apparatus 110 via the communication unit 320, the information of the address connectable to the service of the service providing apparatus 110. In step S1403, the control unit 321 transmits the acquired address information to the information device 130 for which cooperation setting has been made, and sends a service execution demand request. In step S1404, the control unit 321 determines whether the service execution demand request to the wearable information device 120 has been received from the service providing apparatus 110 via the communication unit 320. If YES is determined in step S1404, the process advances to step S1405. In step S1405, the control unit 321 is connected to the service providing apparatus 110 via the communication unit 320 to transmit a service execution demand and receive an execution result. In the case of, for example, the data transfer service, the control unit 321 transmits an execution demand for the data transfer service to the service providing apparatus 110, and acquires generated data.

If it can be determined that the communication speed between the service providing apparatus 110 and the information device 130 with which the wearable information device 120 has been set to cooperate is higher than that between the wearable information device 120 and the service providing apparatus 110, a service execution demand request may be sent to the information device 130 as a partner device for cooperation. For example, the address information acquired from the service providing apparatus 110 is transmitted to the information device 130 as a partner device for cooperation, connectivity from the information device 130 to the service providing apparatus 110 and information capable of determining the communication speed are acquired, and the communication speed is compared with that of the self device, thereby performing determination. If a service execution demand request is sent to the information device 130 as a partner device for cooperation, a service execution result is received from the information device 130, as needed. This can efficiently perform service execution processing.

<Service Execution Demand by Information Device Cooperating with Wearable Information Device>

Figure 15:
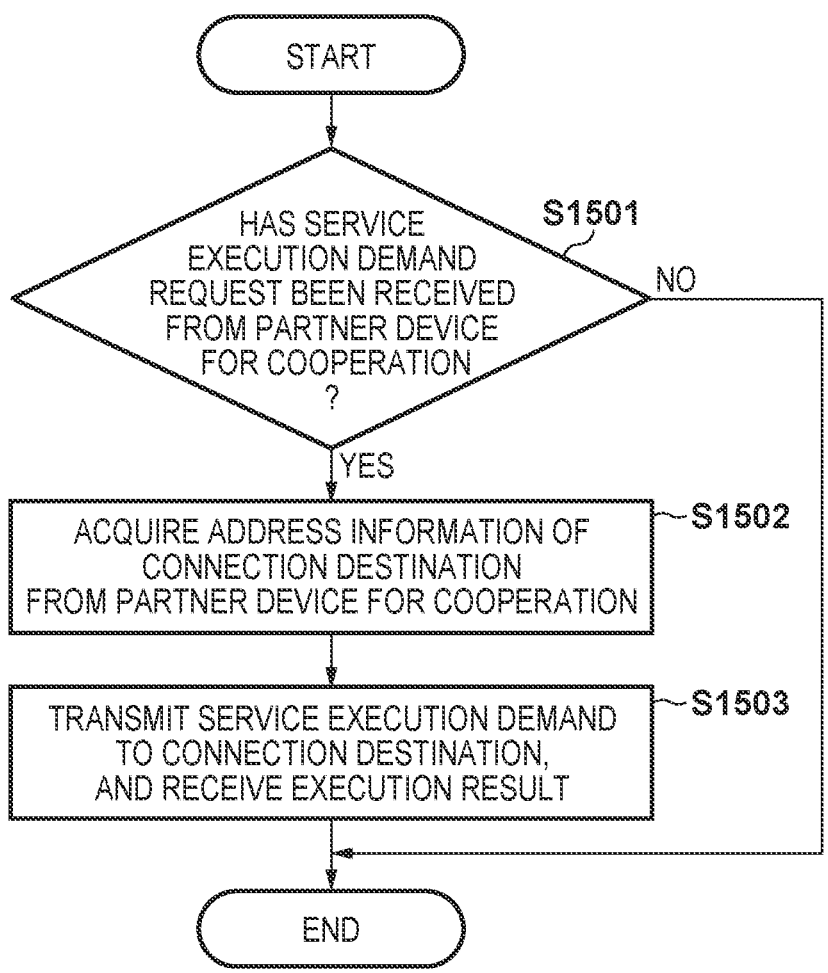
FIG. 15 is a flowchart for explaining processing by the information device according to the first embodiment.

A sequence of performing processing by the information device 130 in response to the service execution request from the wearable information device 120 for which cooperation setting has been made will be described with reference to FIG. 15. FIG. 15 is executed in response to, for example, reception of the service execution demand request transmitted in step S1403 of FIG. 14.

In step S1501, the control unit 331 determines whether the service execution demand request has been received, via the communication unit 330, from the wearable information device 120 for which cooperation setting has been made. If YES is determined in step S1501, the process advances to step S1502. In step S1502, the control unit 331 acquires, via the communication unit 330, the information of the address connectable to the service of the service providing apparatus 110 from the wearable information device 120 for which cooperation setting has been made. In step S1503, the control unit 331 performs connection to the acquired address information, transmits a service execution demand to the service providing apparatus 110, and receives an execution result. In the case of, for example, the data transfer service, the control unit 331 transmits an execution demand for the data transfer service to the service providing apparatus 110, and acquires generated data.

The sequences of the processes by the service providing apparatus 110, wearable information device 120, and information device 130 according to the first embodiment have been explained.

With the arrangements and processing procedures, it is possible to provide the service provided by the service providing apparatus not only to the wearable information device directly connected to the service providing apparatus but also to, via the wearable information device, the information device connected to the wearable information device and cooperating with it. At this time, it is possible to cause the user interface of the service providing apparatus to display the wearable information device and the information device cooperating with it, thereby selecting a service providing destination from the displayed devices. The service can be provided to the selected service providing destination. Therefore, even if the wearable information device connected to the service providing apparatus includes no interface, capability, or function of receiving the provided service, if it cooperates with an information device including the interface, capability, or function, the information device allows the wearable information device to use the service provided by the service providing apparatus.

Furthermore, a user interface for starting execution of the service is displayed by the service providing apparatus. Thus, even if a device having a poor user interface, for example, a wearable information device having only a small display screen uses the service providing apparatus, it is possible to present necessary information to the user, and receive an instruction from the user while the possibility of an operation error is reduced.

Second Embodiment

The first embodiment has described a case in which the service providing apparatus 110 performs service execution processing under the control of the wearable information device 120 or information device 130. That is, the service providing apparatus 110 performs service execution processing in response to a demand from the wearable information device 120 or information device 130. This embodiment will describe a case in which a service providing apparatus 110 has the capability of taking the initiative in performing service execution processing for a wearable information device 120 or an information device 130, and can start service execution processing for the wearable information device 120 or information device 130.

Figure 18:
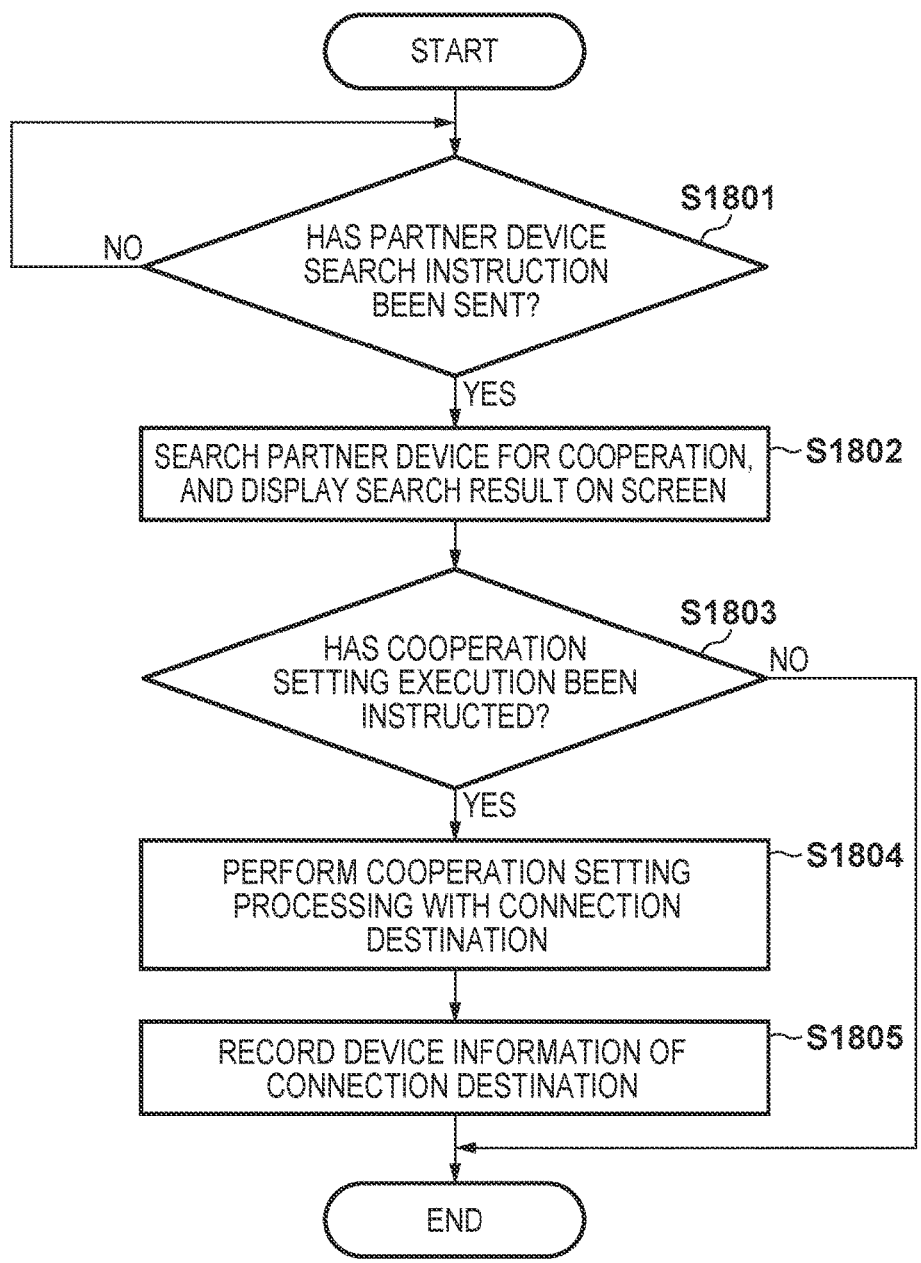
FIG. 18 is a flowchart for explaining processing by the information device according to the second embodiment.

The hardware arrangements and software arrangements of an apparatus and respective devices according to this embodiment are the same as in the first embodiment. The sequence of processing in which the information device 130 makes cooperation setting for the wearable information device 120 will be described with reference to FIG. 18.

<Cooperation Setting Processing by Information Device 130>

Figure 9:
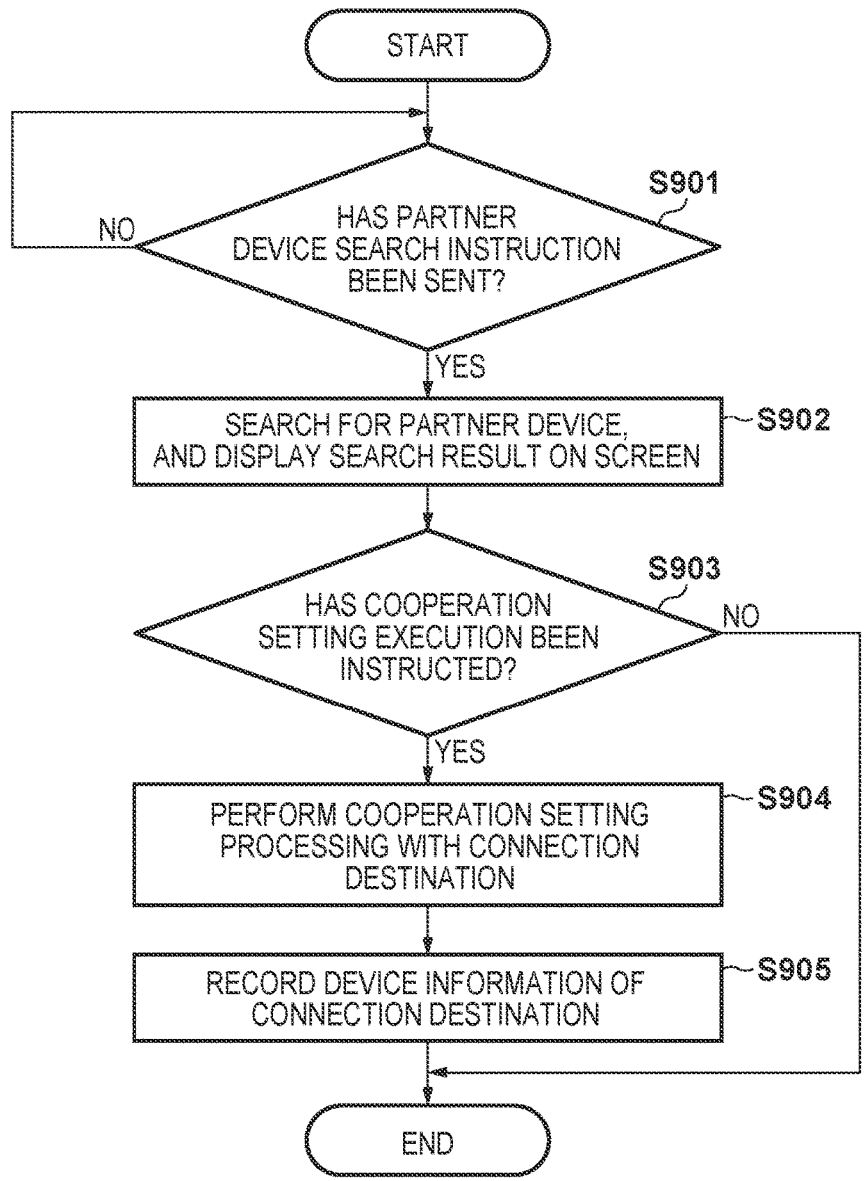
FIG. 9 is a flowchart for explaining processing by the information device according to the first embodiment.

Steps S1801 to S1803 are the same as steps S901 to S903 of FIG. 9, respectively. In step S1804, a control unit 331 performs connection, via a communication unit 330, to an information device for which execution of cooperation setting has been instructed, and performs cooperation setting processing. The cooperation setting processing is performed by transmitting a cooperation setting demand to the information device by P2P communication, and exchanging authentication information in accordance with a response to the demand. Manually input information or prerecorded information is used as authentication information. Furthermore, the control unit 331 acquires device information from the information device as a partner device for cooperation, and transmits device information of itself to the information device as a partner device for cooperation. The device information of itself is recorded in a data storage unit 333. FIG. 17A shows an example of the device information of the information device 130 recorded in the data storage unit 333. A serial number 1701, a device name 1702, a model name 1703, a platform 1704, an OS version 1705, a Wi-Fi address 1706, a Bluetooth address 1707, a corresponding service 1708, and a partner device ID 1710 are the same as the serial number 501, device name 502, model name 503, platform 504, OS version 505, Wi-Fi address 506, Bluetooth address 507, corresponding service 508, and partner device ID 509 of FIG. 5A, respectively. A save destination address 1709 is a data save address for the information device 130, and is address information to be used to perform connection to a storage managed by the information device 130 on the network. By transmitting data from an external apparatus such as the service providing apparatus 110 to this address, the information device 130 can acquire/manage the data. In step S1805, the control unit 331 records, in the data storage unit 333, the device information of the information device for which cooperation setting has been made. FIG. 17B shows an example of the device information, recorded in the data storage unit 333, of the wearable information device 120 for which cooperation setting has been made. A description of FIG. 17B is the same as that of FIG. 5B.

<Cooperation Setting Processing by Wearable Information Device 120>

The sequence of processing in which the wearable information device 120 is set to cooperate with the information device 130 will be described with reference to FIG. 19.

Figure 10:
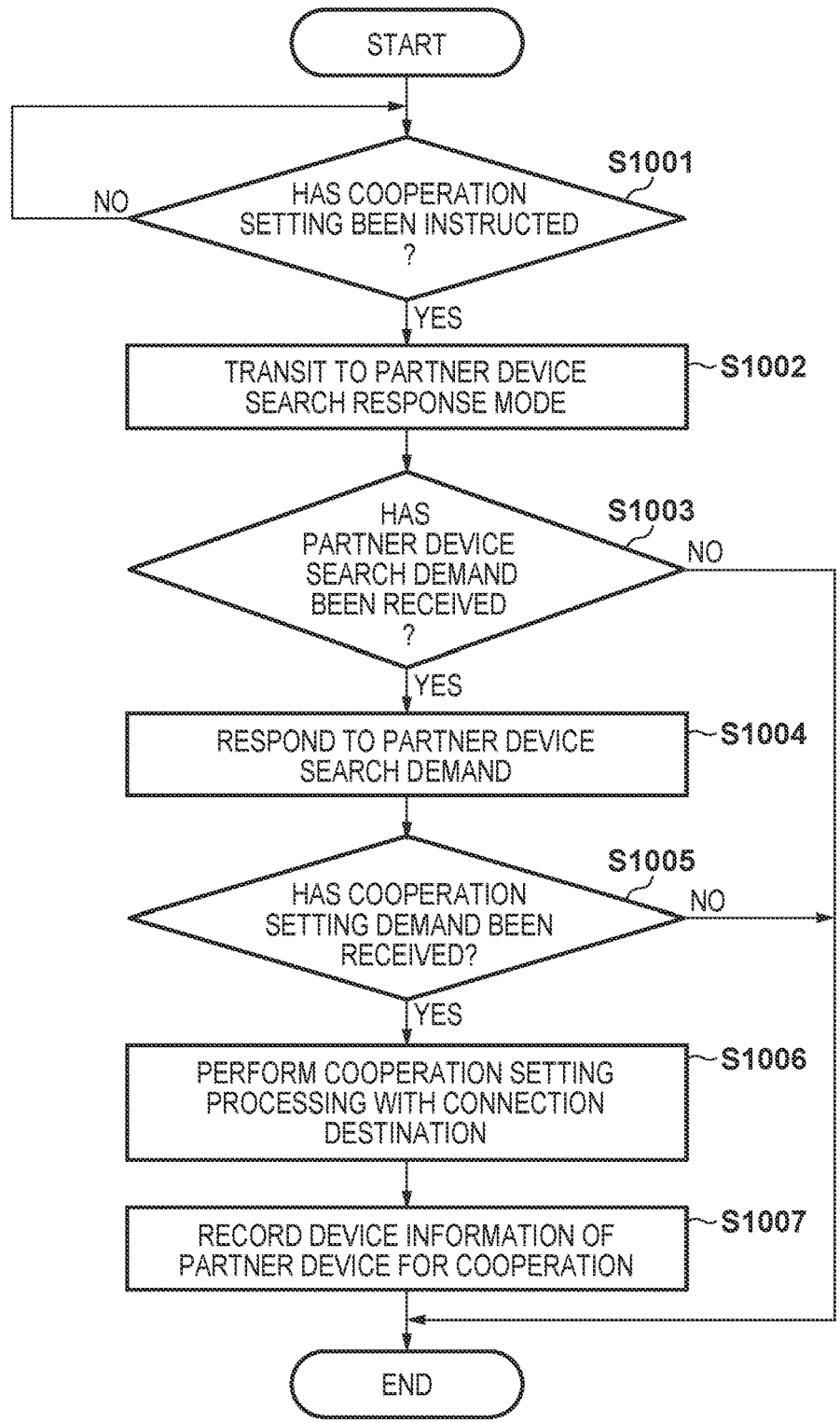
FIG. 10 is a flowchart for explaining processing by the wearable information device according to the first embodiment.

Steps S1901 to S1905 are the same as steps S1001 to S1005 of FIG. 10, respectively. In step S1906, a control unit 321 performs cooperation setting processing with the information device 130 via a communication unit 320. The cooperation setting processing is performed by exchanging authentication information in response to a cooperation setting demand transmitted from the information device 130 by P2P communication. Manually input information or prerecorded information is used as authentication information. Furthermore, the control unit 321 acquires device information from the information device 130, and transmits device information of itself to the information device 130. The device information of itself is recorded in a data storage unit 323. FIG. 16A shows an example of the device information of the wearable information device 120 recorded in the data storage unit 323. A description of FIG. 16A is the same as that of FIG. 4A. In step S1907, the control unit 321 records, in the data storage unit 323, the device information of the information device for which cooperation setting has been made. FIG. 16B shows an example of the device information, recorded in the data storage unit 323, of the information device 130 for which cooperation setting has been made. A partner device ID 1610, serial number 1611, device name 1612, model name 1613, platform 1614, OS version 1615, Bluetooth address 1616, and corresponding service 1617 are the same as the partner device ID 410, serial number 411, device name 412, model name 413, platform 414, OS version 415, Bluetooth address 416, and corresponding service 417 of FIG. 4B, respectively. A save destination address 1618 is a data save address for the information device 130, and is address information to be used to perform connection to the storage managed by the information device 130 on the network. By transmitting data from an external apparatus such as the service providing apparatus 110 to this address, the information device 130 can acquire/manage the data.

<Display, by Service Providing Apparatus, of Information Acquired from Wearable Information Device>

The sequence of processing in which the service providing apparatus 110 displays, on a service use screen, the information acquired from the wearable information device 120 connected by P2P communication will be described with reference to FIG. 20.

Figure 11:
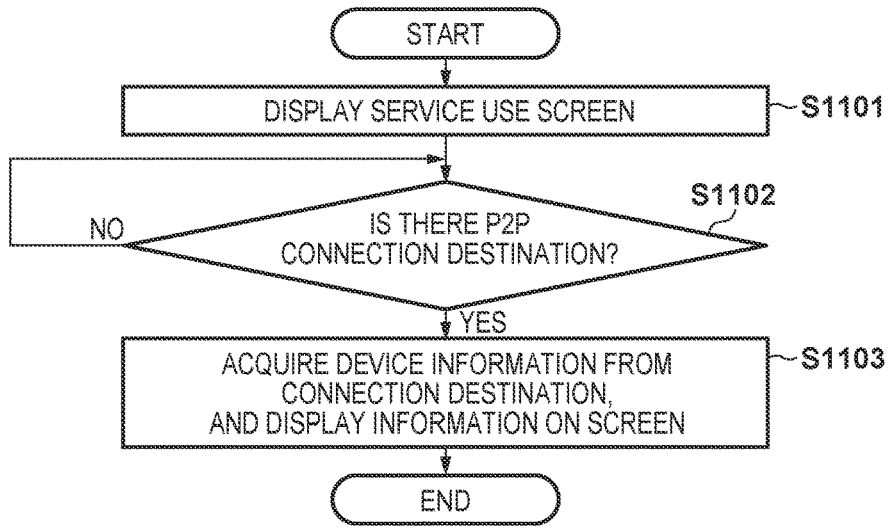
FIG. 11 is a flowchart for explaining processing by the service providing apparatus according to the first embodiment.
Figure 12:
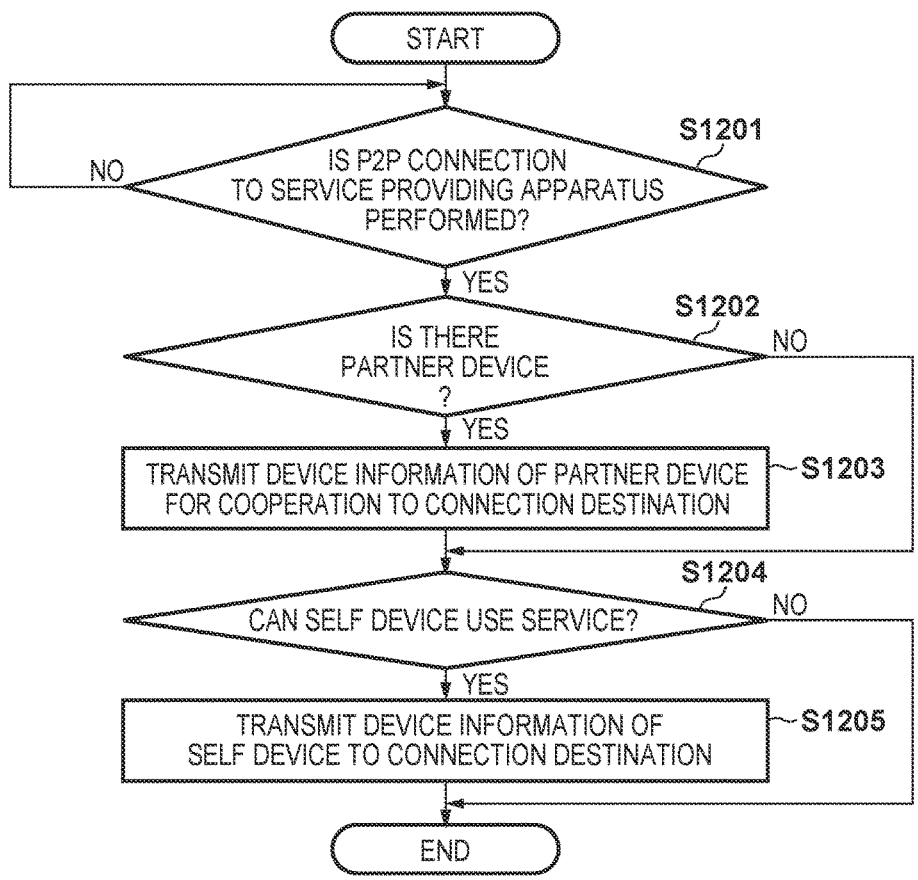
FIG. 12 is a flowchart for explaining processing by the wearable information device according to the first embodiment.

Steps S2001 and S2002 are the same as steps S1101 and S1102 of FIG. 11, respectively. In step S2003, a control unit 311 acquires, via a communication unit 310, device information from the wearable information device 120 connected by P2P communication. An instruction is sent using a display/operation unit 313, and the acquired device information is displayed on the service use screen. The acquired device information includes the device information of the wearable information device 120 and the device information of the information device 130 with which the wearable information device 120 has been set to cooperate. Each piece of device information includes information such as a device name 1602 shown in FIG. 16A described above and the device name 1612 and save destination address 1618 shown in FIG. 16B described above.

FIG. 7A shows an example of the service use screen where the device information of the information device 130 with which the wearable information device 120 connected by P2P communication has been set to cooperate is displayed. FIG. 7A is as described above. FIG. 7B shows an example of the service use screen where the device information of the wearable information device 120 connected by P2P communication and the device information of the information device 130 with which the wearable information device 120 has been set to cooperate are displayed. FIG. 7B is as described above.

Based on information included in the acquired device information, it may be determined whether to display the device information. For example, based on save destination address information included in the acquired device information, the service providing apparatus 110 may display only device information capable of executing the service. In the example of FIG. 16B described above, if the acquired device information includes the save destination address 1618, it is determined that the service is executable, and the device information is displayed. Conversely, if no save destination address 1618 is included, it is determined that the service is inexecutable, and the device information is not displayed. Furthermore, an attempt may be made to perform connection to the acquired save destination address and, only if connection is possible, the device information may be displayed.

<Connection Processing to Service Providing Apparatus by Wearable Information Device>

The sequence of processing in which the wearable information device 120 is connected to the service providing apparatus 110 by P2P communication will be described with reference to FIG. 21. The processing shown in FIG. 21 is executed in response to, for example, a demand to acquire the device information transmitted in step S2003 of FIG. 20.

Step S2101 is the same as step S1201 of FIG. 12. In step S2102, the control unit 321 determines whether there is the information device 130 for which cooperation setting has been made. Whether there is the information device 130 for which cooperation setting has been made is determined based on the device information, recorded in the data storage unit 323, of the information device 130 for which cooperation setting has been made. If the device information of the information device 130 for which cooperation setting has been made is recorded in the data storage unit 323, YES is determined. Furthermore, determination of whether the device information of the information device 130 for which cooperation setting has been made includes a save destination address as the service execution destination of the service providing apparatus 110 may be added. In the example of FIG. 16B, if the save destination address 1618 is included, YES is determined. If YES is determined in step S2102, the process advances to step S2103; otherwise, the process advances to step S2104. In step S2103, the control unit 321 transmits, via the communication unit 320, to the service providing apparatus 110 connected by P2P communication, the device information of the information device 130 for which cooperation setting has been made. The device information includes information such as the device name 1612 and save destination address 1618 of FIG. 16B described above.

In step S2104, the control unit 321 determines whether the wearable information device 120 has a save destination address as a service providing destination. FIG. 16C shows an example of the device information of the wearable information device 120 including the save destination address recorded in the data storage unit 323. A serial number 1620, device name 1621, model name 1622, platform 1623, OS version 1624, Wi-Fi address 1625, Bluetooth address 1626, and partner device ID 1628 of FIG. 16C are the same as a serial number 1601, the device name 1602, a model name 1603, a platform 1604, an OS version 1605, a Wi-Fi address 1606, a Bluetooth address 1607, and a partner device ID 1608 of FIG. 16A, respectively. A save destination address 1627 is the same as the save destination address 1618 of FIG. 16B. If the save destination address 1627 is included, YES is determined in step S2104. In step S2105, the control unit 321 transmits device information of itself to the service providing apparatus 110 connected by P2P communication. In the example of FIG. 16C, the device information is transmitted by including information such as the device name 1621 and save destination address 1627. Note that if the control unit 321 has already transmitted the device information of itself in step S2101 at the time of connection to the service providing apparatus 110, it need not transmit the device information again in step S2105 in some cases.

<Service Execution Processing by Service Providing Apparatus>

Figure 22:
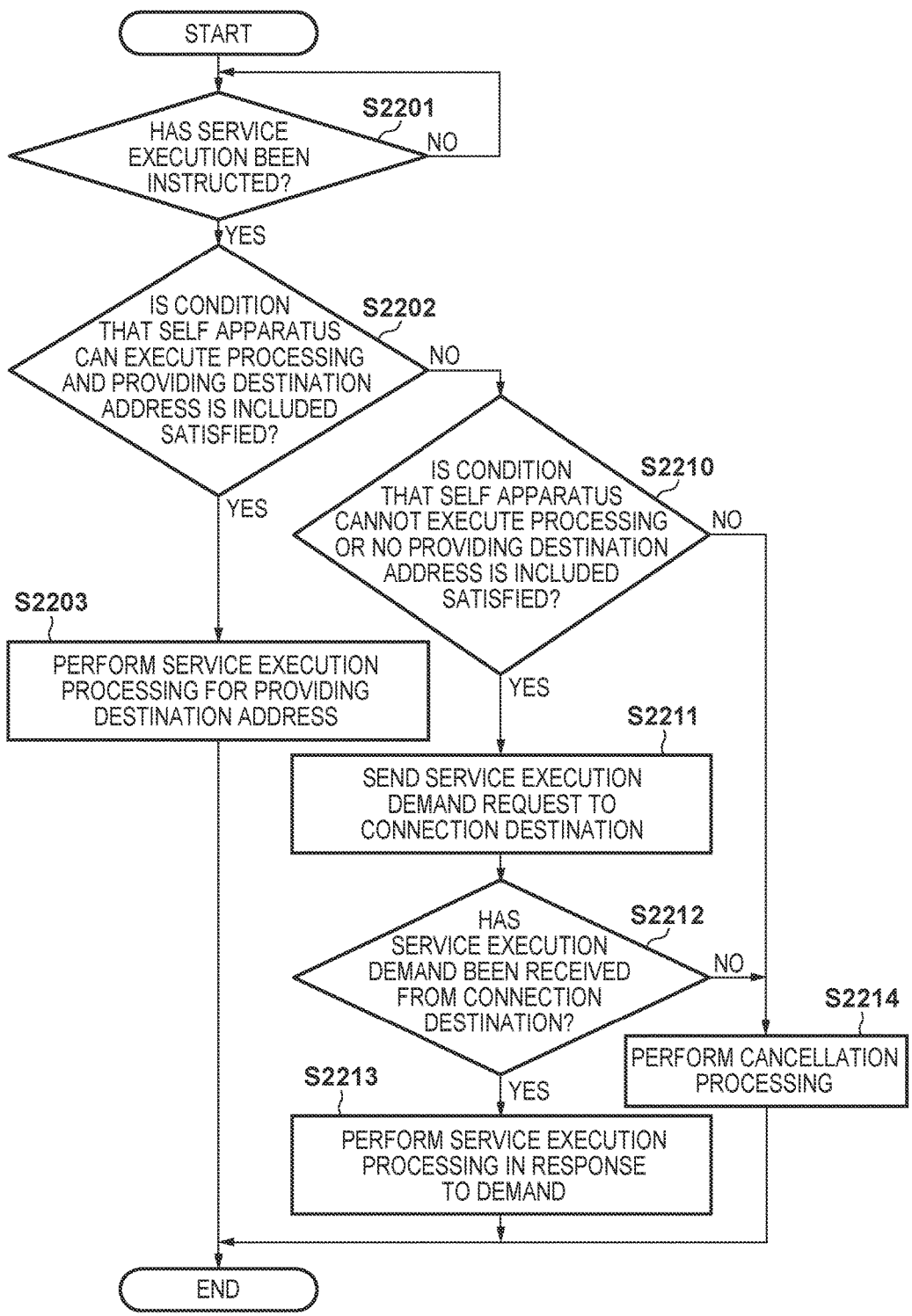
FIG. 22 is a flowchart for explaining processing by the service providing apparatus according to the second embodiment.

A sequence of performing service execution processing in the service providing apparatus 110 will be described with reference to FIG. 22.

Figure 13A:
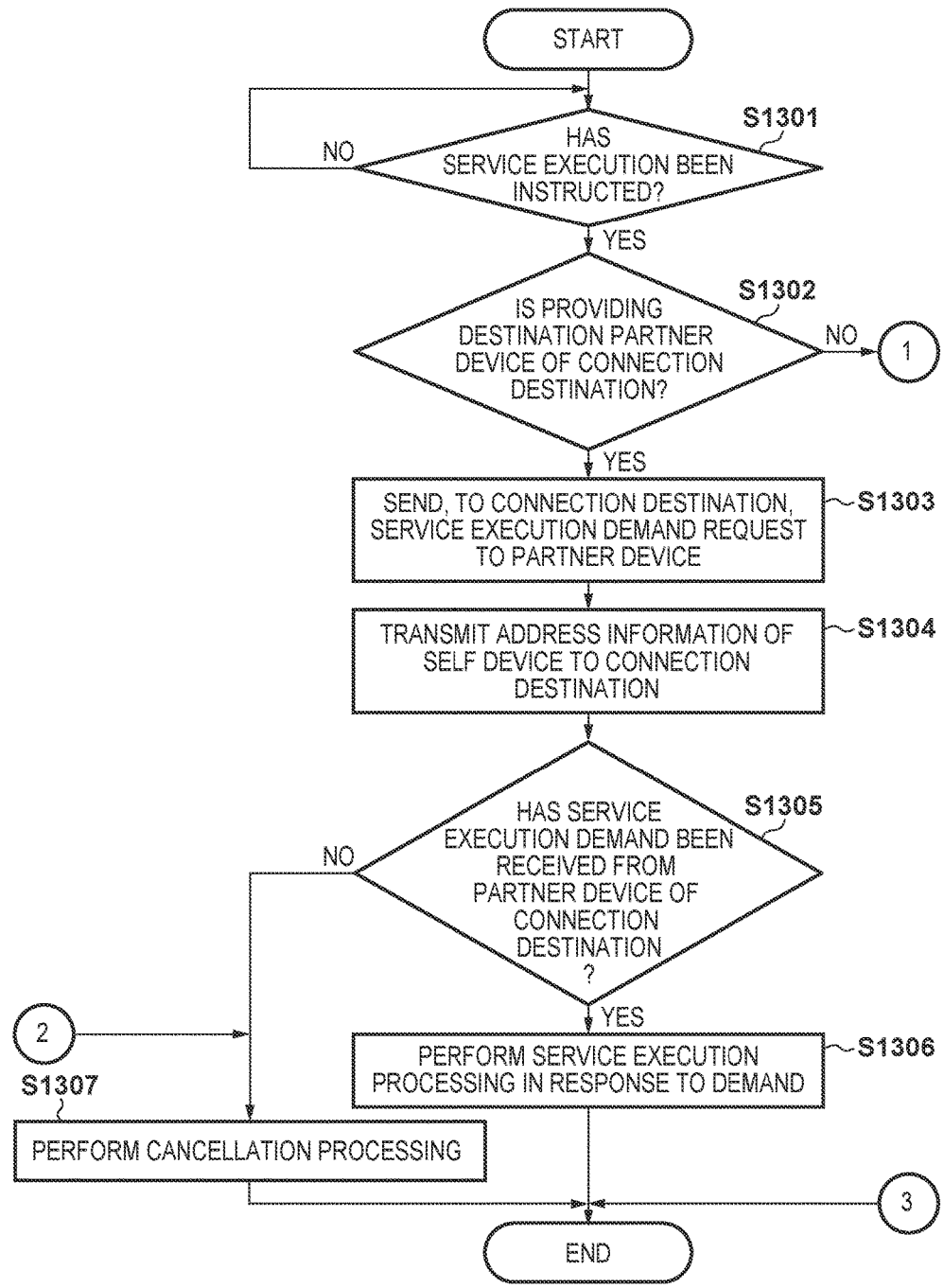

Step S2201 is the same as step S1301 of FIG. 13A. In step S2202, the control unit 311 determines whether the service providing apparatus 110 has the capability of performing service execution processing for the wearable information device 120 or information device 130, and the device information of an instructed service providing destination includes a save destination address as a service providing destination. If YES is determined in step S2202, the process advances to step S2203; otherwise, the process advances to step S2210. In step S2203, the control unit 311 performs the service execution processing for the save destination address of the instructed service providing destination. If, for example, the service to be provided is the data transfer service, the input/output unit 312 is controlled in accordance with the settings of the service providing apparatus to generate data, and the data is transmitted to the save destination address of the providing destination via the communication unit 310. Therefore, in step S2203, the control unit 311 directly transmits the data to the device designated as the save destination address. In step S2210, the control unit 311 determines whether the condition that the service providing apparatus 110 has no capability of performing the service execution processing for the wearable information device 120 or information device 130 or the device information of the instructed service providing destination includes no save destination address is satisfied. If YES is determined in step S2210, the process advances to step S2211. Steps S2211 to S2214 are the same as steps S1303 to S1307 or steps S1311 to S1313 of FIGS. 13A and 13B, respectively. Note that instead of branching to step S2210, the process may branch to step S1302 of FIG. 13A. Upon receiving the service execution demand request transmitted in step S2211, S1303, or S1311, the wearable information device 120 transmits a service execution demand to the service providing apparatus 110 in accordance with the procedure shown in FIG. 14 or the information device 130 transmits a service execution demand to the service providing apparatus 110 in accordance with the procedure shown in FIG. 15.

The sequences of the processes by the service providing apparatus 110, wearable information device 120, and information device 130 according to the second embodiment have been described.

According to this embodiment, with the above arrangements and procedures, if the service providing apparatus 110 can execute the service, execution of the service can be started without control of the information device or the like. At this time, the service is provided to a designated device. For example, in an image reading service or the like, if the address of a transmission destination or the like is designated in advance, a so-called push-type service of, for example, transmitting read image data to a designated memory location is possible. Furthermore, the designated service providing destination may be a wearable information device connected to the service providing apparatus or an information device cooperating with the wearable information device, and the service can be provided to any of the devices.

As in the first embodiment, a user interface for starting execution of the service is displayed by the service providing apparatus. Therefore, if a device having a poor user interface, for example, a wearable information device including only a small display screen uses the service providing apparatus, it is possible to present necessary information to the user, and receive an instruction from the user while the possibility of an operation error is reduced.

Other Embodiments

In the above embodiments, the service providing apparatus 110 has been described as one independent device but may be a server module of software incorporated in a device. For example, by incorporating a general-purpose server module in various devices, these devices can be used as service providing apparatuses 110, thereby implementing the system according to each of the above embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-129200, filed Jun. 26, 2015 which is hereby incorporated by reference herein in its entirety.

What is claimed is:

1. An information processing apparatus capable of communicating, using predetermined wireless communication, with a wearable computer device, the information processing apparatus comprising,
a memory storing instructions; and
a processor which is capable of executing the instructions causing the information processing apparatus to:
store information for identifying the information processing apparatus, wherein the stored information includes a device name and address information;
detect, by the predetermined wireless communication, the wearable computer device, which a user is wearing, wherein the stored information is different than information for identifying the detected wearable computer device;
receive information of a pairing terminal paired with the detected wearable computer device directly from the detected wearable computer device by using the predetermined wireless communication, and
in response to a reception of a request, transmit data according to the received information of the pairing terminal,
wherein the data is transmitted via a communication different from a communication between the detected wearable computer device and the pairing terminal.

2. The information processing apparatus according to claim 1, wherein the instructions further cause the information processing apparatus to perform a display related to the pairing terminal as a transmission target based on the received information of the pairing terminal.

3. The information processing apparatus according to claim 1, wherein the instructions further cause the information processing apparatus to perform a display related to the wearable computer device as a transmission target.

4. The information processing apparatus according to claim 1, wherein the data is transmitted via a communication different from the predetermined wireless communication according to the received information of the pairing terminal.

5. The information processing apparatus according to claim 1, wherein the predetermined wireless communication is communication by Bluetooth® Low Energy.

6. The information processing apparatus according to claim 1, wherein the information processing apparatus includes one of an image forming apparatus, a physical information measurement apparatus, and a car.

7. The information processing apparatus according to claim 1, wherein the request is received from the wearable computer device or the pairing terminal.

8. The information processing apparatus according to claim 1, wherein the received information of the pairing terminal is address information of the pairing terminal.

9. The information processing apparatus according to claim 1, wherein the wearable computer device has a shape similar to one of a wristwatch type, a spectacle type, a ring type, and a card type.

10. The information processing apparatus according to claim 1, wherein the pairing terminal includes a mobile terminal, a tablet terminal and a personal computer.

11. A control method for an information processing apparatus capable of communicating, using predetermined wireless communication, with a wearable computer device the control method comprising,
storing information for identifying the information processing apparatus, wherein the stored information includes a device name and address information;
detecting, by the predetermined wireless communication, the wearable computer device, which a user is wearing, wherein the stored information is different than information for identifying the detected wearable computer device;
receiving information of a pairing terminal paired with the detected wearable computer device directly from the detected wearable computer device by using the predetermined wireless communication, and
in response to a reception of a request, transmitting data according to the received information of the pairing terminal,
wherein the data is transmitted via a communication different from a communication between the detected wearable computer device and the pairing terminal.

12. A non-transitory computer readable medium for storing a program for causing a computer capable of communicating, using predetermined wireless communication, with a wearable computer device, to:
store information for identifying the information processing apparatus, wherein the stored information includes a device name and address information;
detect, by the predetermined wireless communication, the wearable computer device, which a user is wearing, wherein the stored information is different than information for identifying the detected wearable computer device;
receive information of a pairing terminal paired with the detected wearable computer device directly from the detected wearable computer device by using the predetermined wireless communication, and
in response to a reception of a request, transmit data according to the received information of the pairing terminal,
wherein the data is transmitted via a communication different from a communication between the detected wearable computer device and the pairing terminal.

* * * * *